United States Patent
Al Ghossein et al.

(10) Patent No.: US 10,795,108 B2
(45) Date of Patent: Oct. 6, 2020

(54) SPRING ASSIST CABLE CLAMPS

(71) Applicant: Hubbell Incorporated, Shelton, CT (US)

(72) Inventors: Rabih M. Al Ghossein, Birmingham, AL (US); John Edward Sakmar, Birmingham, AL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/663,440

(22) Filed: Jul. 28, 2017

(65) Prior Publication Data

US 2018/0031795 A1 Feb. 1, 2018

Related U.S. Application Data

(60) Provisional application No. 62/368,462, filed on Jul. 29, 2016, provisional application No. 62/509,240, filed on May 22, 2017.

(51) Int. Cl.
*H01R 4/44* (2006.01)
*H01R 4/38* (2006.01)
(Continued)

(52) U.S. Cl.
CPC .......... *G02B 6/4471* (2013.01); *F16L 3/1033* (2013.01); *G02B 6/4478* (2013.01);
(Continued)

(58) Field of Classification Search
CPC .......... F16L 3/11; F16L 3/1041; F16L 3/1083; F16L 3/1033; G02B 6/4471; G02B 6/48;
(Continued)

(56) References Cited

U.S. PATENT DOCUMENTS 1,489,835 A 4/1924 Kietz
1,603,035 A 10/1926 Evans
(Continued)

FOREIGN PATENT DOCUMENTS

JP 08308071 11/1996
JP 10042438 2/1998
JP 2001136643 5/2001

OTHER PUBLICATIONS

International Search Report and Written Opinion mailed in International Application PCT/US17/44496 dated Oct. 12, 2017 (7 pages).

(Continued)

*Primary Examiner* — Tan Le
(74) *Attorney, Agent, or Firm* — Wissing Miller LLP

(57) ABSTRACT

A cable clamp for clamping drop cables to main span cables. The cable clamp has a body that includes an elongated drop cable guide, an elongated main span cable guide, and main body section between the drop cable guide and the main span cable guide. The body has a lower body half and an upper body half. The lower body half is movable relative to the upper body half between at least one open position and a clamping position. When the body is in a clamping position the lower body half and upper body half of the drop cable guide form a drop cable opening, and the lower body half and upper body half of the main span cable guide form a main span cable opening. A stem extends through the lower body half of the main body section and is releasably secured to the upper body half of the main body section such that rotational movement of the stem is translated to movement of the lower body half relative to the upper body half. The stem has a collar and a spring is positioned on the stem between the collar and the lower body half of the main body section to normally bias the body to the clamping position.

33 Claims, 25 Drawing Sheets

(51) Int. Cl.
*H01R 11/11* (2006.01)
*G02B 6/44* (2006.01)
*H02G 7/08* (2006.01)
*F16L 3/10* (2006.01)
*G02B 6/48* (2006.01)
*H01R 11/15* (2006.01)

(52) U.S. Cl.
CPC ............... *G02B 6/483* (2013.01); *H02G 7/08* (2013.01); *H01R 4/44* (2013.01); *H01R 11/15* (2013.01); *Y10T 24/3439* (2015.01)

(58) Field of Classification Search
CPC .. H01R 4/44; H01R 11/15; H02G 7/08; Y10T 403/7144; Y10T 24/3439
USPC ............... 248/58, 65, 68.1, 74.1; 174/480; 439/781, 479, 815; 403/391; 24/135 R, 24/335, 569
See application file for complete search history.

(56) References Cited

U.S. PATENT DOCUMENTS

| | | | |
|---|---|---|---|
| 2,120,447 A | 3/1935 | Tipsord | |
| 2,107,061 A | 1/1937 | Pittman et al. | |
| 2,206,653 A | 10/1939 | Yonkers | |
| 2,397,390 A | 3/1946 | Wadsworth | |
| 2,530,299 A | 7/1947 | Hendley | |
| 2,574,796 A | 11/1951 | Moore | |
| 2,651,766 A * | 9/1953 | Runde | H01R 4/38 174/94 R |
| 2,811,703 A | 10/1957 | Becker | |
| 2,867,787 A | 3/1958 | Nilsson | |
| 3,036,286 A | 3/1960 | Gorc et al. | |
| 2,958,067 A | 10/1960 | Hardy | |
| 3,075,166 A | 1/1963 | Peek | |
| 3,132,914 A | 5/1964 | Wengen | |
| 3,142,535 A | 7/1964 | Roosman | |
| 3,177,459 A * | 4/1965 | Toedtman | H01R 11/15 24/335 |
| 3,188,602 A * | 6/1965 | Toedtman | H01R 11/15 439/479 |
| 3,431,538 A * | 3/1969 | Hubbard | H01R 4/40 403/391 |
| 3,614,700 A | 10/1971 | Beard et al. | |
| 3,830,427 A | 8/1974 | Polidori | |
| 3,923,363 A | 12/1975 | Kraft | |
| 4,183,686 A | 1/1980 | De France | |
| 4,293,176 A | 10/1981 | Linklof | |
| 4,600,264 A | 7/1986 | Counsel | |
| 4,707,051 A * | 11/1987 | Hall | H01R 4/44 439/781 |
| 4,836,725 A | 7/1989 | Williams et al. | |
| 5,004,437 A | 4/1991 | Walter et al. | |
| 5,021,014 A | 6/1991 | Walter et al. | |
| D329,244 S | 9/1992 | Saito et al. | |
| 5,369,849 A | 12/1994 | De France | |
| 5,440,665 A | 8/1995 | Ray | |
| 5,539,961 A | 6/1996 | DeFrance | |
| 5,547,404 A | 8/1996 | Nellis, Jr. et al. | |
| 5,692,930 A | 12/1997 | Garver et al. | |
| 6,371,419 B1 | 4/2002 | Ohnuki | |
| 6,390,861 B1 | 5/2002 | DeFrance | |
| 6,595,472 B1 | 7/2003 | Pisczak | |
| 6,732,981 B2 | 5/2004 | Franks | |
| 7,029,316 B2 | 4/2006 | Jackson, III | |
| 7,066,024 B2 | 6/2006 | Watchel | |
| 7,160,142 B2 | 1/2007 | Hughes et al. | |
| 7,666,024 B2 * | 2/2010 | De France | H01R 4/4872 439/479 |
| 8,152,070 B2 | 4/2012 | Al-Hussein et al. | |
| 8,512,070 B2 * | 8/2013 | De France | H01R 4/38 439/479 |
| 8,672,716 B2 | 3/2014 | DeFrance | |
| 9,577,351 B2 * | 2/2017 | Martin | H01R 4/2408 |
| 2002/0142674 A1 | 10/2002 | Chadbourne et al. | |
| 2013/0303035 A1 | 11/2013 | Neal et al. | |
| 2018/0031795 A1* | 2/2018 | Al Ghossein | G02B 6/4471 |

OTHER PUBLICATIONS

International Search Report and Written Opinion mailed in International Application PCT/US17/44402 dated Oct. 6, 2017.
Hubbell Brochure "Overhead Primary Taps Hot Line Tap Clamps Aluminum", Dec. 2014 (32 pages).
Fargo Brochure "GH-700A", Jan. 1995 (2 pages).
Burndy Fastap Introduction Sheet 2014.
Burndy Fastap Installation Instructions 2014.

* cited by examiner

SPRING ASSIST CABLE CLAMPS

CROSS REFERENCE TO RELATED APPLICATIONS

The present application is based on and claims benefit from U.S. Provisional Application Ser. No. 62/368,462 filed Jul. 29, 2016 entitled "Spring Assist Cable Clamps" and from U.S. Provisional Application Ser. No. 62/509,240 filed May 22, 2017 entitled "Spring Assist Cable Clamps" and the entire contents of both are incorporated herein by reference.

BACKGROUND

Field

The present disclosure relates generally to clamps for utility cabling and more particularly to cable clamps for clamping drop cables to main span cables.

Description of the Related Art

Aerial cabling, such as fiber optic cabling, is typically strung from utility pole to utility pole, or from a utility pole to a building. The cabling between utility poles is often referred to as a main span. To withstand cable sag and environmental conditions, two types of fiber optic cables are available to string from pole-to-pole or from pole-to-building: lashed fiber optic cables or self-supporting fiber optic cables. Lashed fiber optic cable uses a galvanized steel support wire to which the fiber optic cable is affixed or lashed. Self-supporting fiber optic cable typically includes a strength member in the form of a messenger section supporting the fiber optic cable, and a carrier section that includes optical fibers, or optical fibers and electrical conductors. An example of self-supporting fiber optic cable is RPP cable manufactureed by Corning Cable Systems.

With aerial fiber optic cabling, connections between fiber cables are typically made in close proximity to the utility pole or building. However, there are instances where drop connections are needed. Drops are cable connections between a main span and a drop cable at a point along the main span. Drops for fiber optic cabling are used when, for example, smaller quantities of fibers are needed to feed a terminal. The smaller quantities of fibers are in a drop cable and run to a terminal located at a utility pole or building.

Drops are achieved on lashed aerial cable using a bolted cable clamp with a hook. The cable clamp is bolted to the galvanized steel support wire that the fiber optic cable is lashed to, and then a dead-end is attached to the hook to hold the drop. In instances where a bucket truck can be used, a technician would bolt the cable clamp to the galvanized steel support wire while standing in the bucket. In instances where a bucket truck cannot be used, a technician would lean a ladder against the galvanized steel support wire in order to bolt the cable clamp to the galvanized steel support wire.

However, such bolted cable clamps are not suitable for self-supporting fiber optic cable as they do not use a galvanized steel support wire. In addition, self-supporting fiber optic cables do not allow for the support of a ladder leaning against it. As a result, in instances where a bucket truck cannot be used, the clamp has to be installed from the ground using extendable reach tools, e.g., a hot stick. Typical bolted type cable clamps are not suitable for such ground based installations. Accordingly, a cable clamp capable of clamping a drop cable to a main span cable is needed. The present disclosure provides a cable clamp that can be used with self-supporting or lashed fiber optic cables for drops where the cable clamp is to be installed from the ground.

SUMMARY

The present disclosure provides embodiments of cable clamps for clamping drop cables to main span cables. In one exemplary embodiment, the cable clamp has a body, a stem and a spring. The body has an elongated drop cable guide, an elongated main span cable guide and a main body section between the drop cable guide and the main span cable guide. The body has a lower body half coupled to an upper body half using the stem and spring, where the lower body half is movable relative to the upper body half between one or more open position and a clamping position. When the body is in the clamping position, the lower body half and upper body half of the drop cable guide form a drop cable opening and the lower body half and upper body half of the main span cable guide form a main span cable opening. The stem extends through the lower body half of the main body section and is releasably secured to the upper body half of the main body section such that rotational movement of the stem is translated to movement of the lower body half relative to the upper body half. The stem has a collar, and the spring is positioned on the stem between the collar and the lower body half of the main body section to normally bias the lower body half toward the upper body half.

In another exemplary embodiment, the cable clamp has a body having a lower body half and an upper body half. The lower body half is movable relative to the upper body half between at least one open position and a clamping position. When the body is in a clamping position the lower body half and upper body half form a drop cable opening and a main span cable opening. A stem extends through the lower body half and is releasably secured to the upper body half such that rotational movement of the stem is translated to movement of the lower body half relative to the upper body half. The stem has a collar and a spring is positioned on the stem between the collar and the lower body half to normally bias the body to the clamping position.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
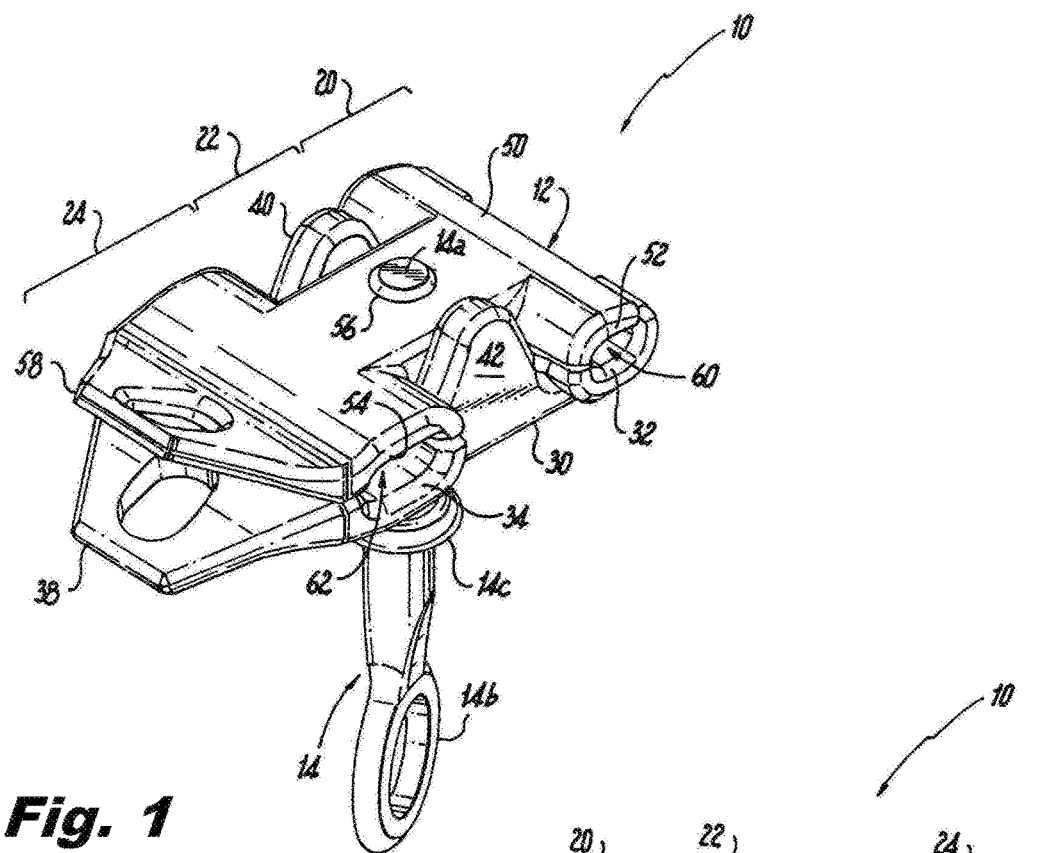
FIG. 1 is a top perspective view of an exemplary embodiment of a cable clamp according to the present disclosure illustrating the cable clamp in a clamping position.

Exemplary embodiments of the cable clamp of the present disclosure are shown. For ease of description, the cable clamp described herein may also be referenced as the "clamp." The clamp according to the present disclosure is configured to be installed from the ground with an extendable reach tool, such as a hot stick. Initial spring tension temporarily holds a drop cable in a drop cable opening in a drop cable section of the clamp, and a main span cable is snapped into a main span cable opening in a main span cable section of the clamp.

Referring now to the figures, in particular FIGS. 1-6, an exemplary embodiment of the clamp according to the present disclosure is shown. The clamp 10 includes a body 12, a stem 14 and a spring 16. The body 12 has a lower body half 30 and an upper body half 50. For general reference purposes the body 12 is split into three sections: a drop cable section 20, an intermediate section 22 and a main span cable section 24. The stem 14 is preferably an eyestem that has a threaded end 14a, an eye 14b for coupling with an extendable reach tool, for example, a hot stick, and a collar 14c for supporting the spring 16. The body 12, stem 14 and spring 16 may be made of a metallic material, such as aluminum, cast aluminum, galvanized steel or stainless steel, or a combination of metallic materials. In another exemplary embodiment, the body 12, stem 14 and spring 16 may be made of a non-metallic material, such as a rigid plastic or composite materials e.g., carbon fiber.

Figure 2:
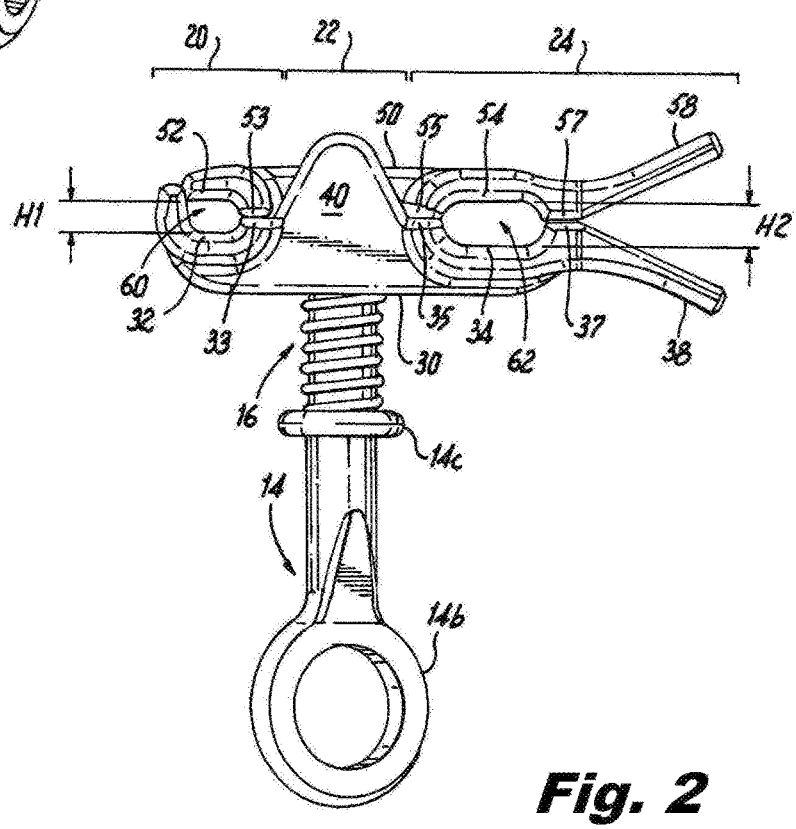
FIG. 2 is a side elevation view of the cable clamp of FIG. 1.
Figure 3:
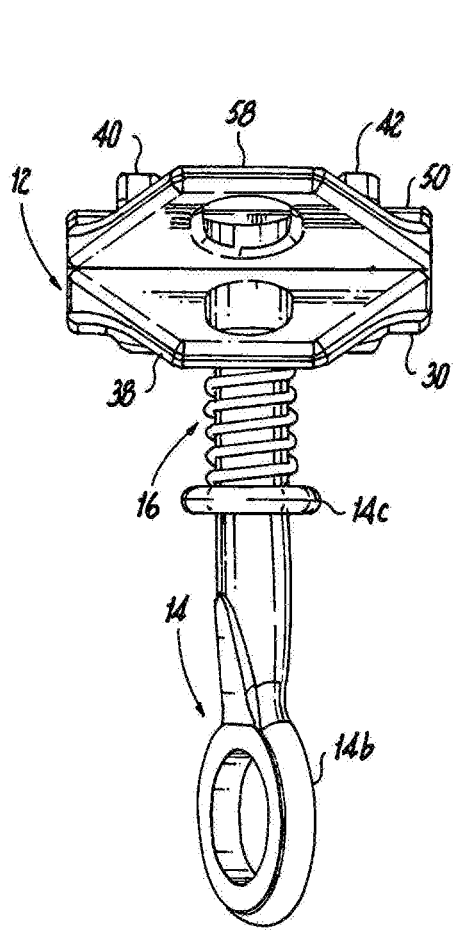
FIG. 3 is a rear elevation view of the cable clamp of FIG. 1.
Figure 4:
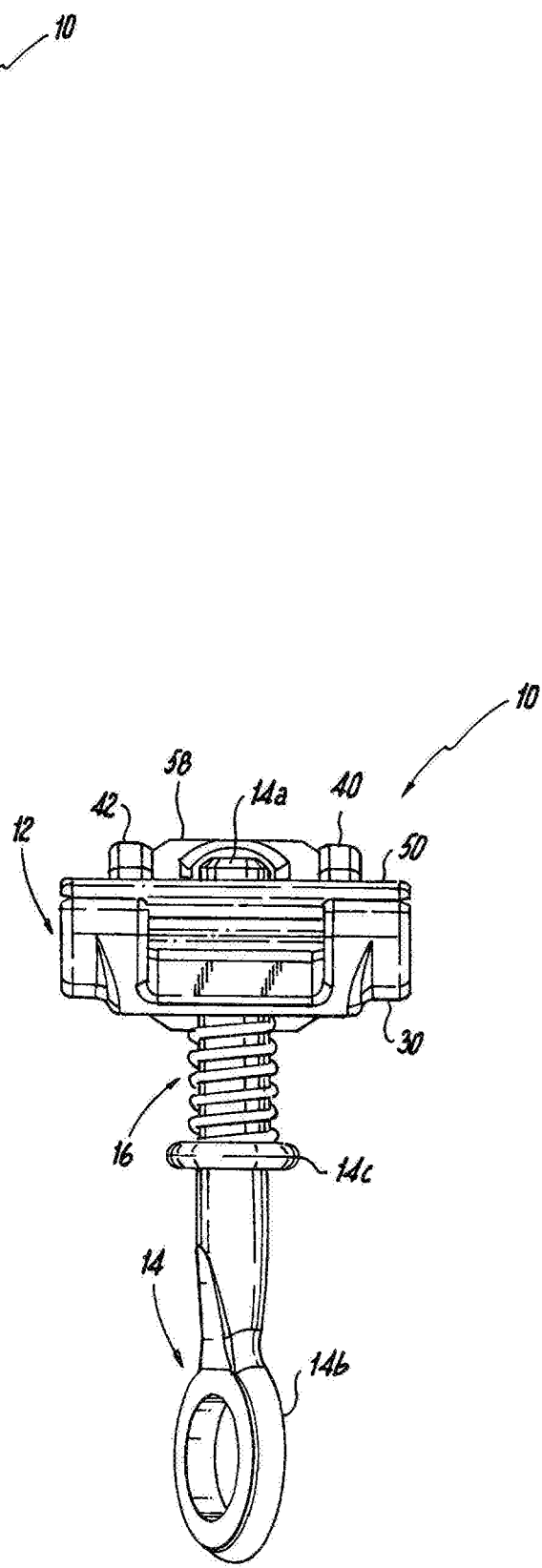
FIG. 4 is a front elevation view of the cable clamp of FIG. 1.
Figure 5:
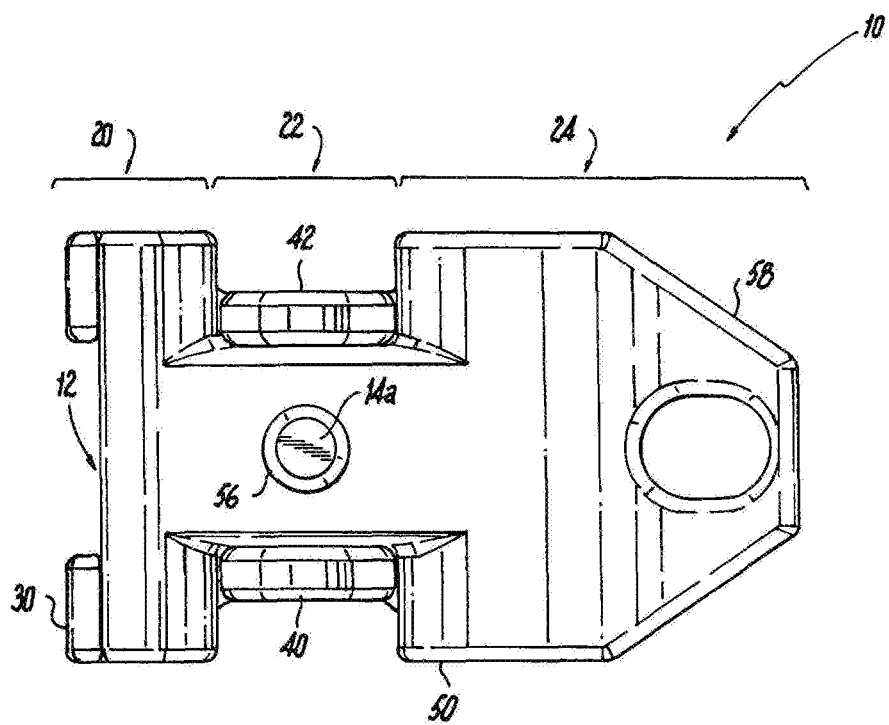
FIG. 5 is a top plan view of the cable clamp of FIG. 1.
Figure 6:
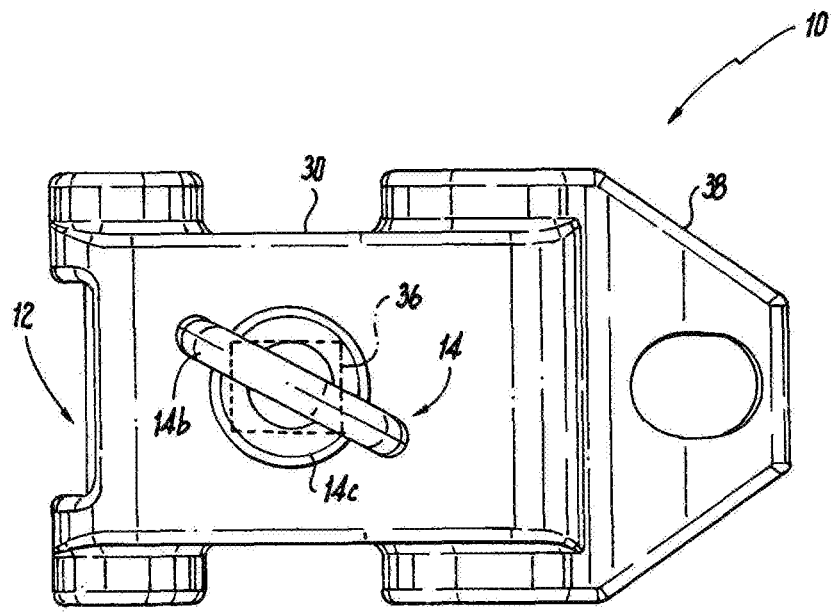
FIG. 6 is a bottom plan view of the cable clamp of FIG. 1.
Figure 7:
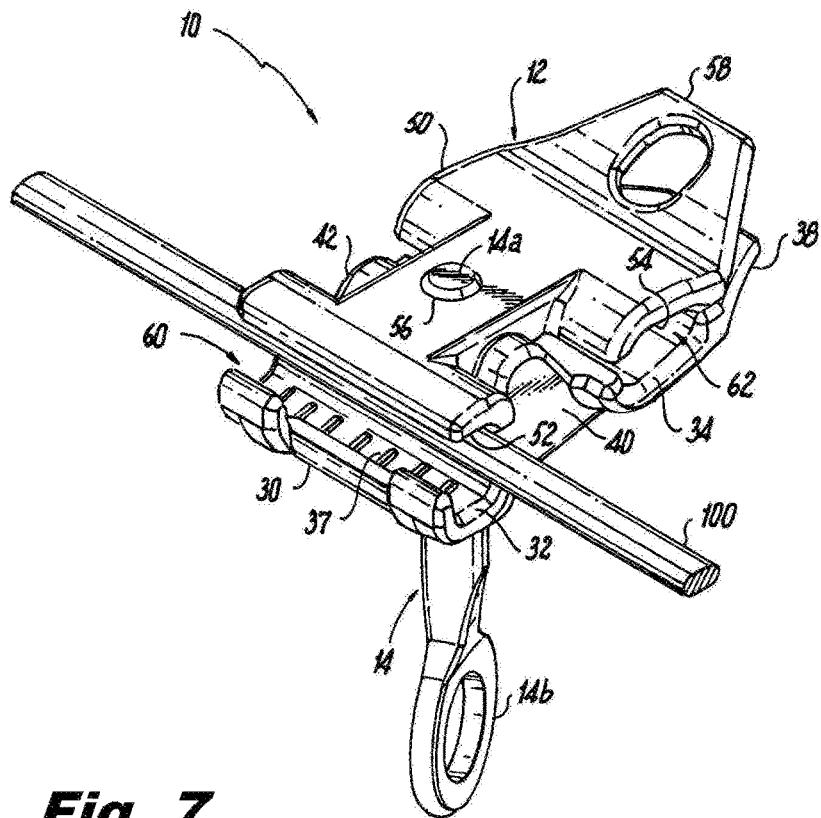
FIG. 7 is a top perspective view of the cable clamp of FIG. 1, illustrating a drop cable section of the cable clamp in a first open position, and a drop cable within a drop cable opening in the cable clamp.

The lower body half 30 has a drop cable groove 32 in the drop cable section 20 and a main span cable groove 34 in the main span cable section 24. The intermediate section 22 of the lower body 30 between the drop cable groove 32 and the main span cable groove 34 has an oblong opening 36, seen in FIG. 6, that permits the stem 14 to pass through the lower body half 30 and allows the lower body half 30 to pivot on the stem 14 relative to the upper body half 50. The lower body 30 has a lower lever arm 38 extending from the main span cable section 24 as shown in FIG. 2. The lower lever arm 38 is preferably at an angle relative to the lower body half 30. The lower lever arm 38 is used when attaching cables to the clamp 10, as will be described below. Extending from the lower body half 30 toward the upper body half 50 are two stabilizing arms 40 and 42 that with the intermediate section 22 of the lower body half 30 form a cradle in which the upper body half 50 sits. The stabilizing arms 40 and 42 prevent rotational or lateral movement of the lower body half 30 relative to the upper body half 50 when installing the clamp 10 on a main span cable or drop cable.

The upper body half 50 has a drop cable groove 52 in the drop cable section 20 and a main span cable groove 54 in the main span cable section 24, shown in FIGS. 1 and 2. The intermediate section 22 of the upper body 50 between the drop cable groove 52 and the main span cable groove 54 is configured so that the intermediate section 22 of the upper body sits between the stabilizing arms of the lower body half 30. The intermediate section 22 of the upper body 50 between the drop cable groove 52 and the main span cable groove 54 has a threaded opening 56, seen in FIG. 5, that is aligned with the oblong opening 36, seen in FIG. 6, on the lower body half 30 and configured to receive a threaded portion of the stem 14 to releasably couple the lower body half 30 to the upper body half 50. The upper body 50 has an upper lever arm 58 extending from the main span cable section 24 of the upper body, as shown in FIG. 2. The upper lever arm 58 is preferably at an angle relative to the upper body half 50. The upper lever arm 58 is used when attaching cables to the clamp 10, as will be described below.

Thus, the clamp 10 has two body halves 30 and 50 that when coupled together by the stem 14 and spring 16 are configured to hold a main span cable and a drop cable. More specifically, the spring 16 is held between the lower body half 30 and the collar 14c on the stem 14 and when the clamp 10 is in a clamping position a clamping force keeps the lower body half 30 and the upper body half 50 coupled together. When the two body halves 30 and 50 are in the clamping position, the drop cable grooves 32 and 52 in the drop section 20 of the body 12 form a drop cable opening 60 for receiving a drop cable. Similarly, when the two body halves 30 and 50 are in the clamping position, the main span cable grooves 34 and 54 in the main span section 24 of the body 12 form a main span cable opening 62 for receiving a main span cable.

Figure 8:
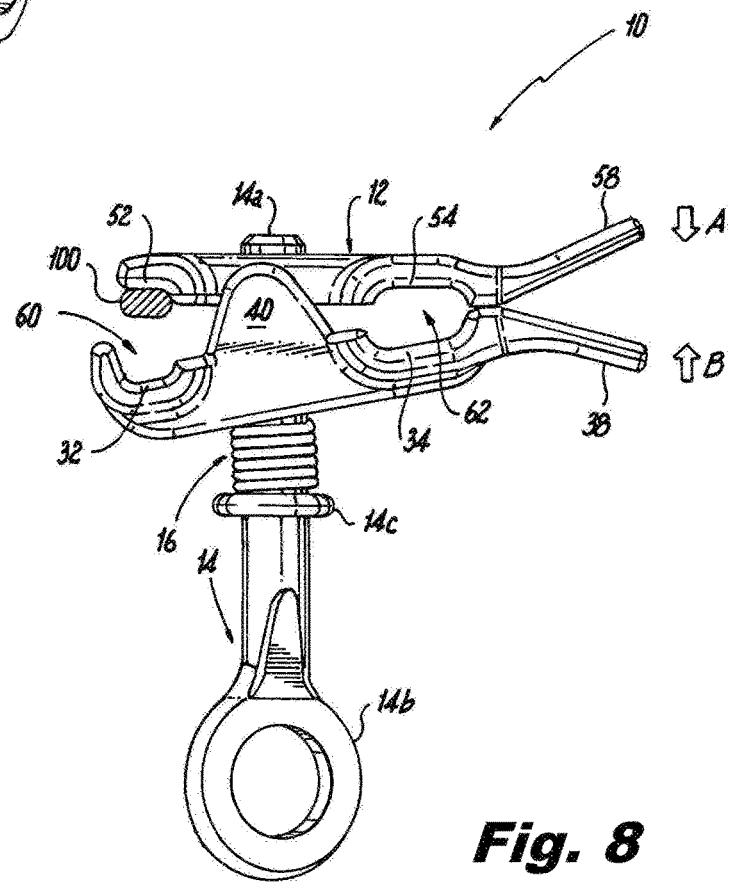
FIG. 8 is a side elevation view of the cable clamp of FIG. 7, illustrating the drop cable section of the cable clamp in the first open position, and the drop cable within the drop cable opening in the cable clamp.
Figure 9:
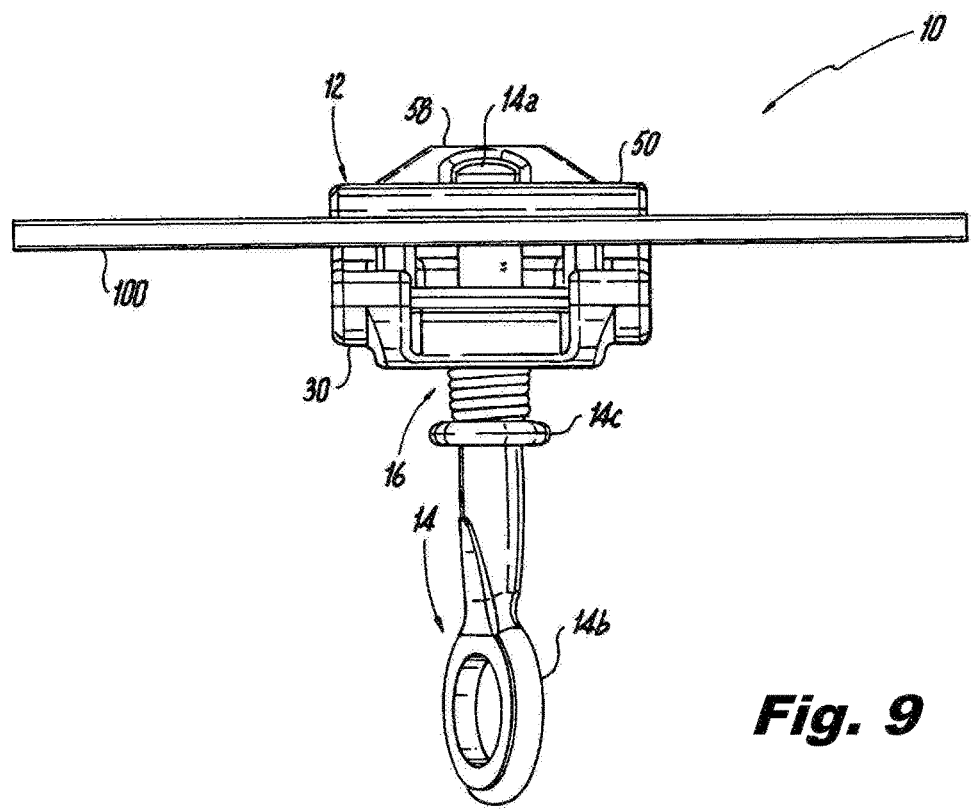
FIG. 9 is a front elevation view of the cable clamp of FIG. 7, illustrating the drop cable section of the cable clamp in the first open position, and the drop cable within the drop cable opening in the cable clamp.
Figure 10:
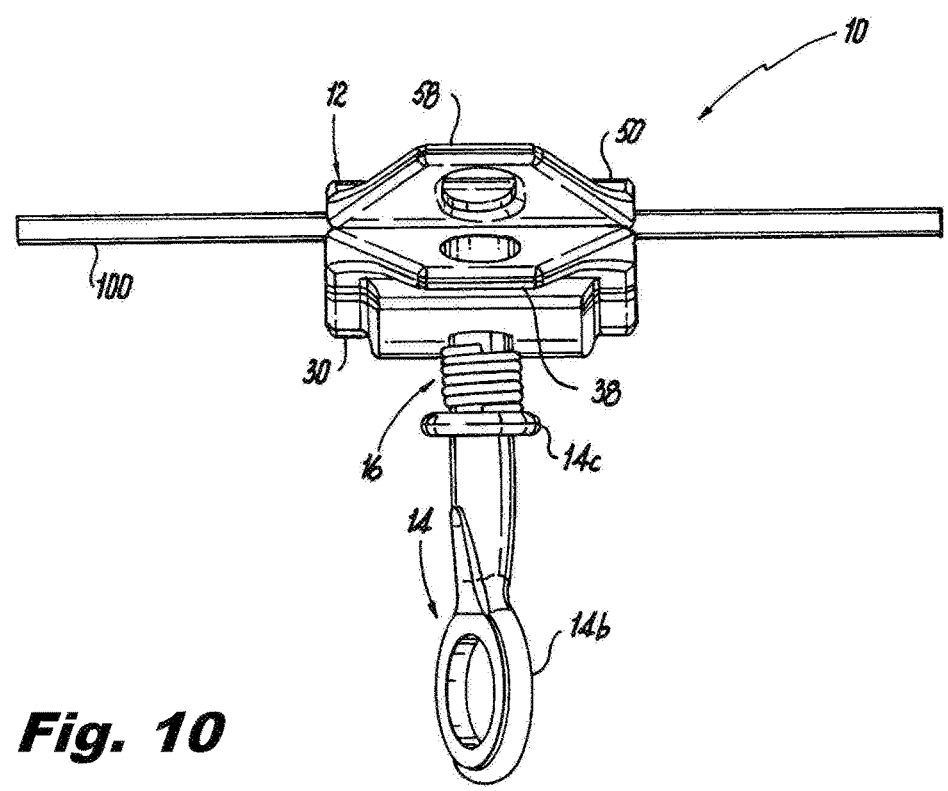
FIG. 10 is a rear elevation view of the cable clamp of FIG. 7, illustrating the drop cable section of the cable clamp in the first open position, and the drop cable within the drop cable opening in the cable clamp.
Figure 11:
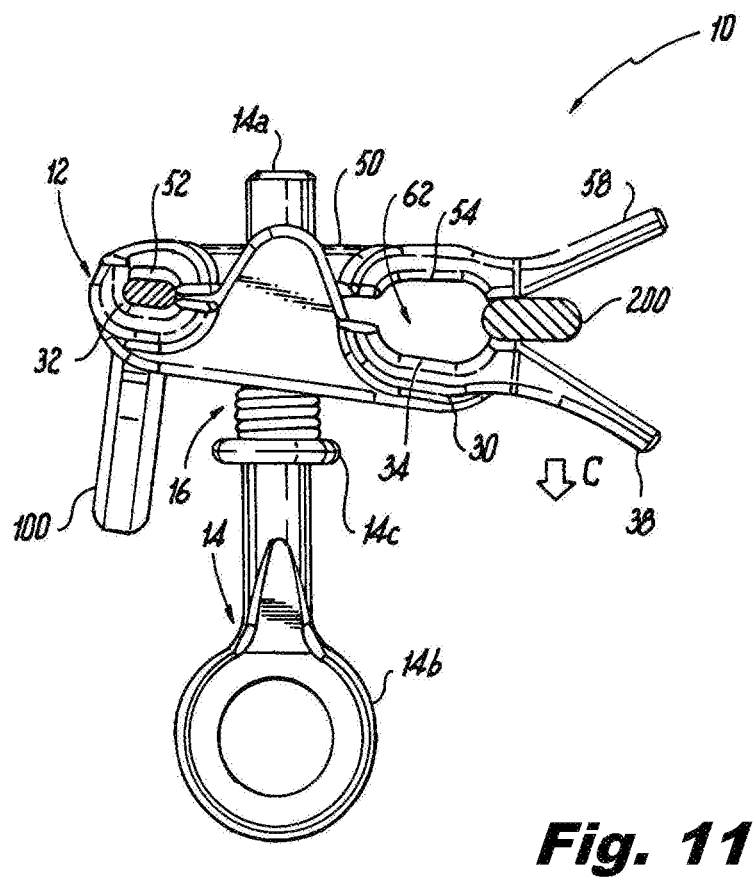
FIG. 11 is a side elevation view of the cable clamp of FIG. 1, illustrating a drop cable in a drop cable section of the cable clamp in a clamping position, and a main span cable moving the body to a second open position where a main span cable opening of a main span cable section of the cable clamp is accessible.
Figure 12:
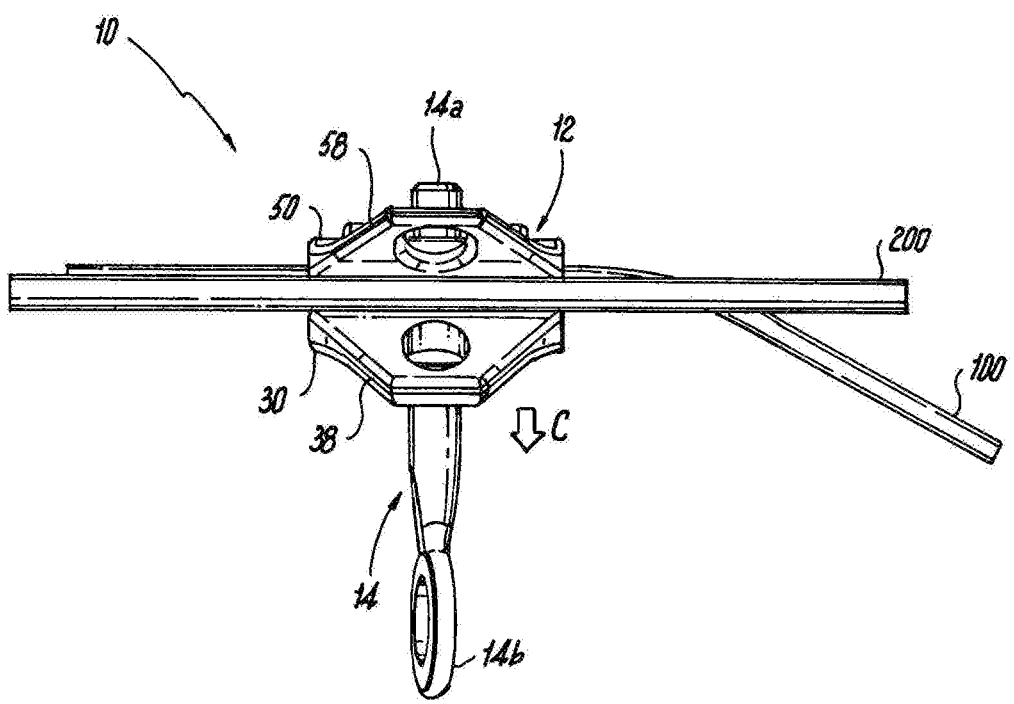
FIG. 12 is a rear elevation view of the cable clamp of FIG. 11, illustrating the main span cable being inserted into the main span cable opening of the main span cable section of the cable clamp.
Figure 13:
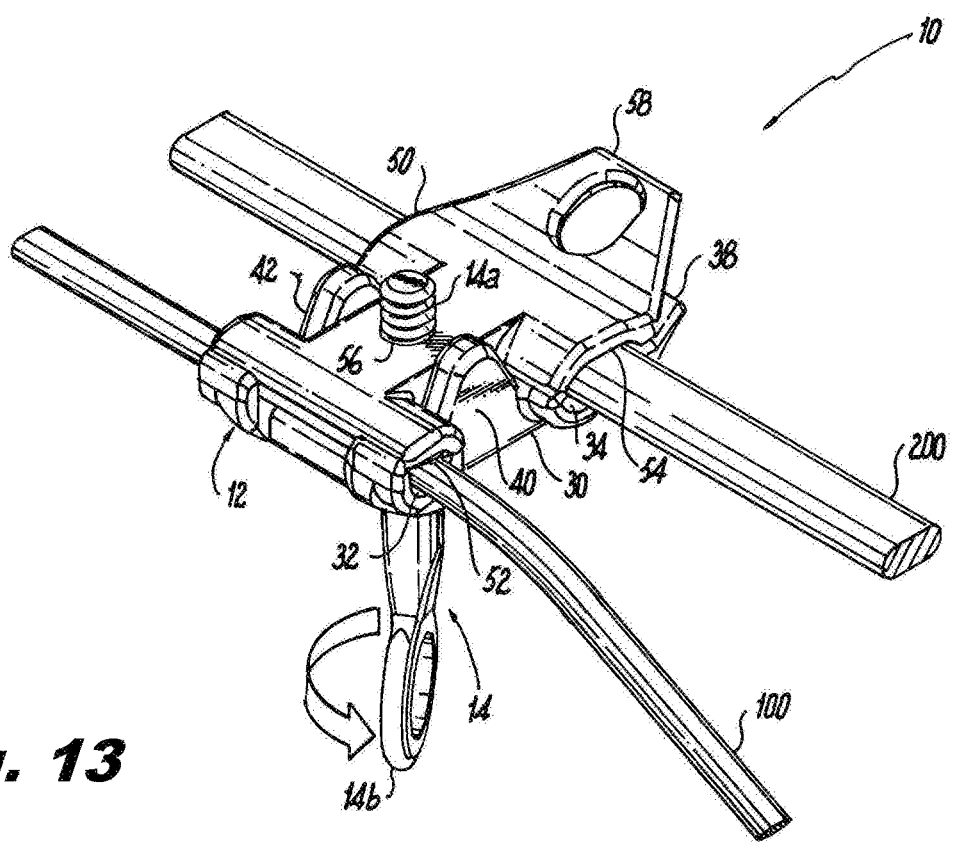
FIG. 13 is a top perspective view of the cable clamp of FIG. 1, illustrating the cable clamp body in a clamping position, a drop cable in a drop cable opening on a drop cable section of the cable clamp, and a main span cable in a main span cable opening in a main span cable section of the cable clamp.
Figure 14:
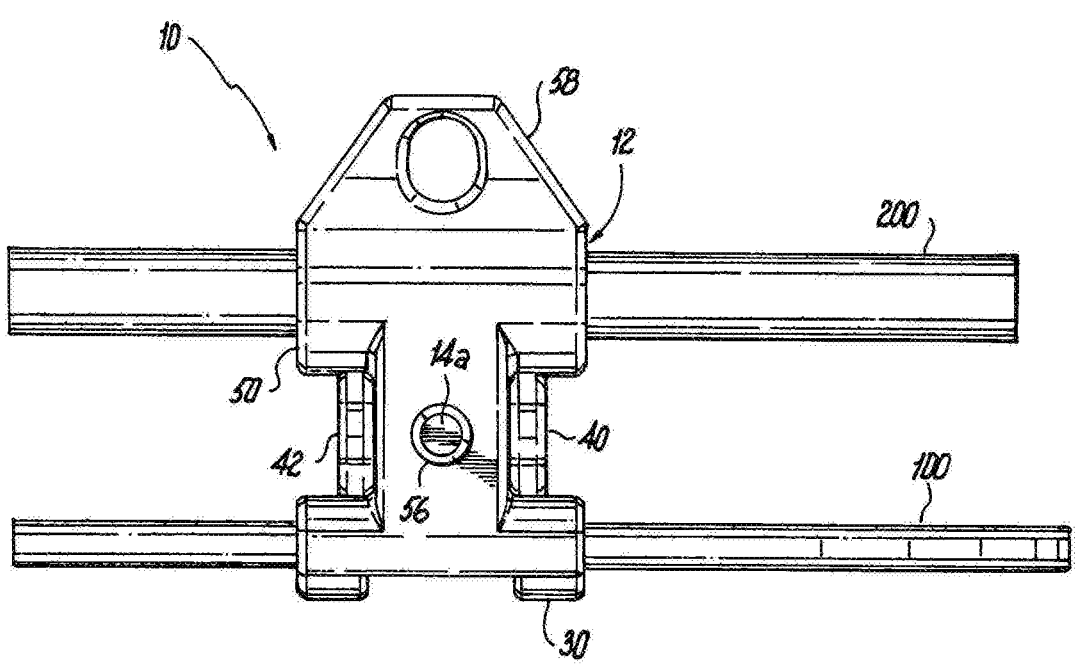
FIG. 14 is a top plan view of the cable clamp and cables of FIG. 13.
Figure 15:
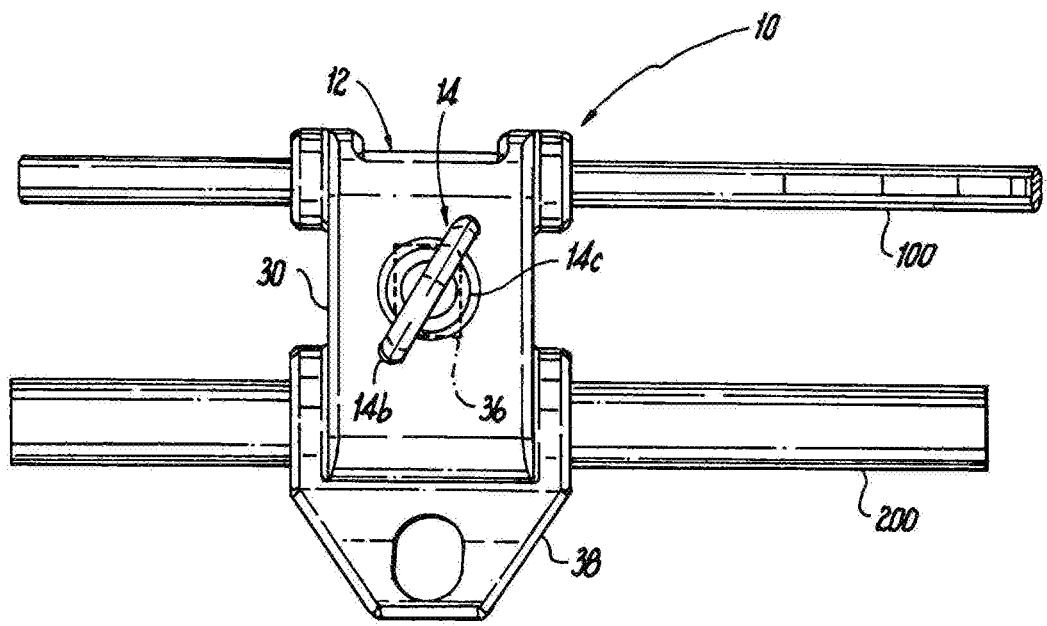
FIG. 15 is a top plan view of the cable clamp and cables of FIG. 13.
Figure 16:
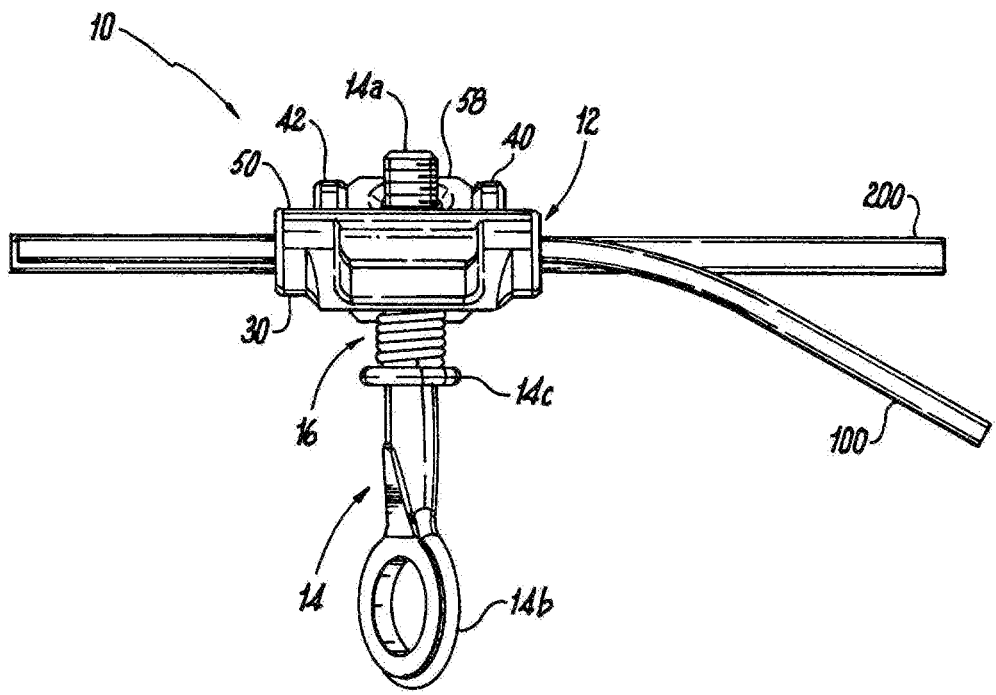
FIG. 16 is a front plan view of the cable clamp and cables of FIG. 13.
Figure 17:
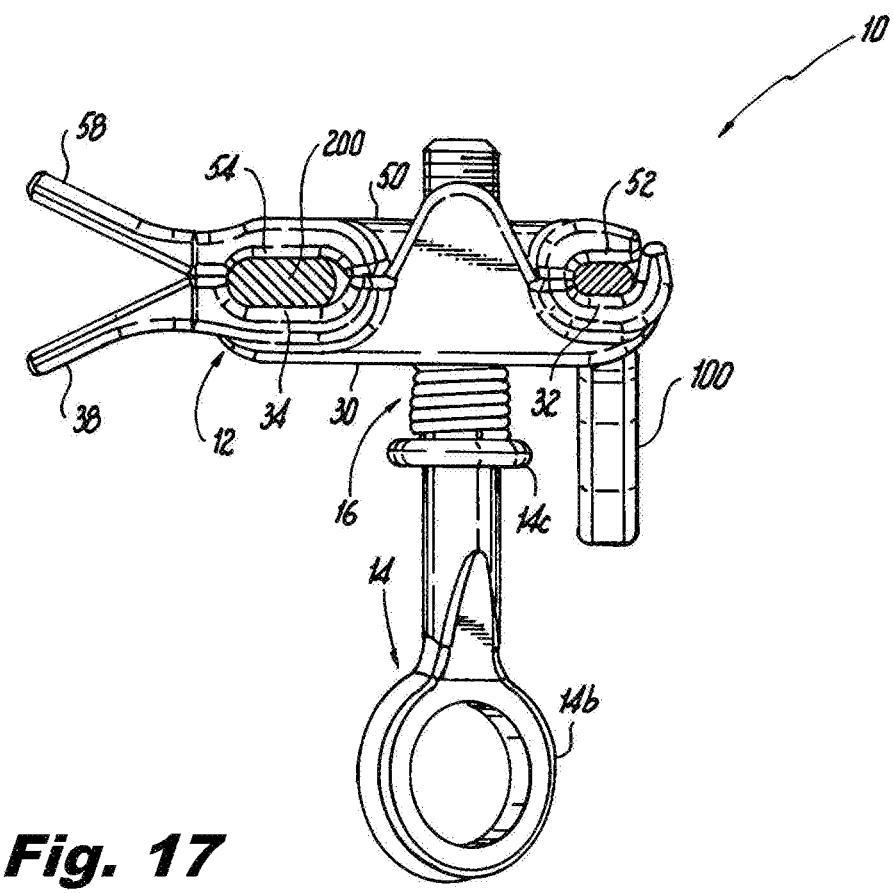
FIG. 17 is a side elevation view of the cable clamp and cables of FIG. 13.
Figure 18:
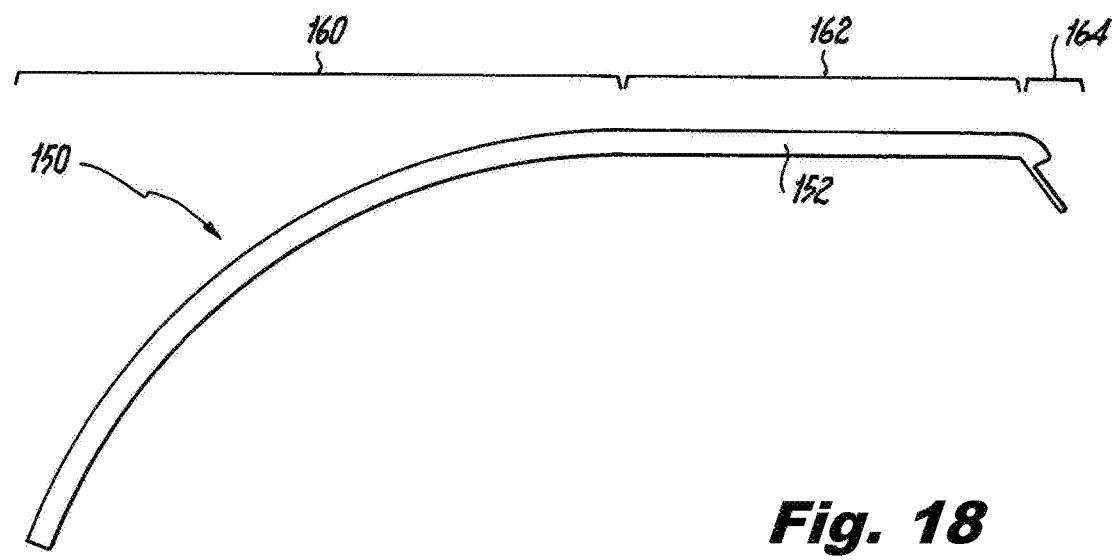
FIG. 18 is a side view of an exemplary embodiment of a shim that can be used with the cable clamp of the present disclosure.
Figure 19:
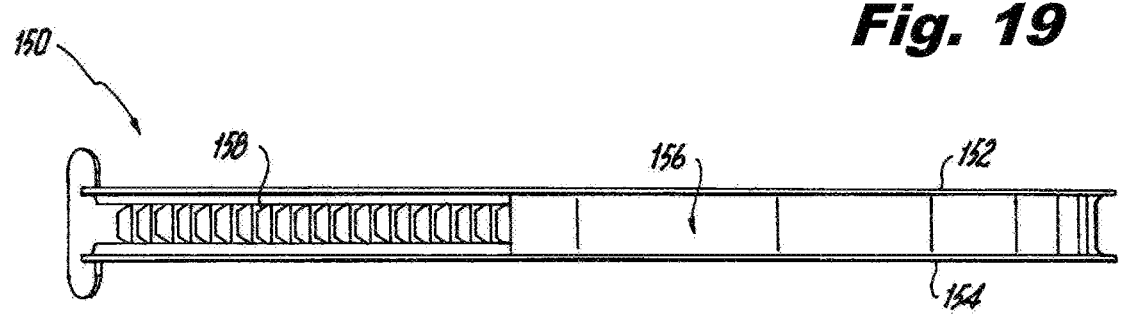
FIG. 19 is a top plan view of the shim of FIG. 18.
Figure 20:
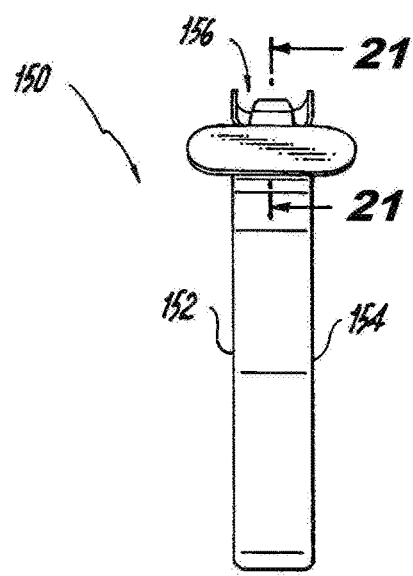
FIG. 20 is a front elevation view of the shim of FIG. 18.
Figure 21:
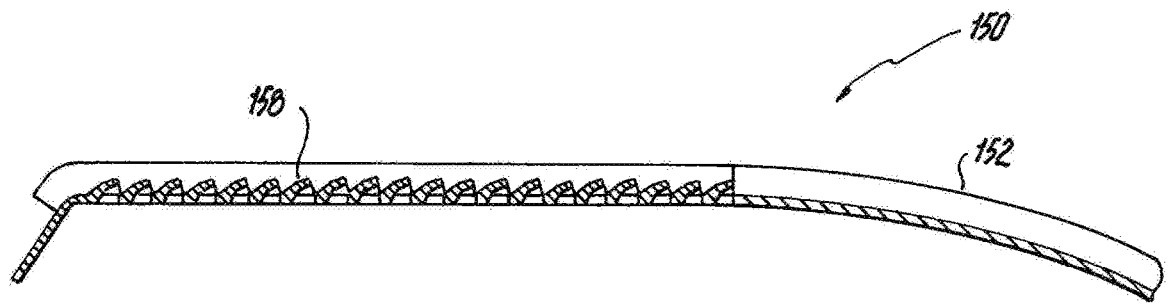
FIG. 21 is a cross sectional view of the shim of FIG. 20 taken along line 21-21.
Figure 22:
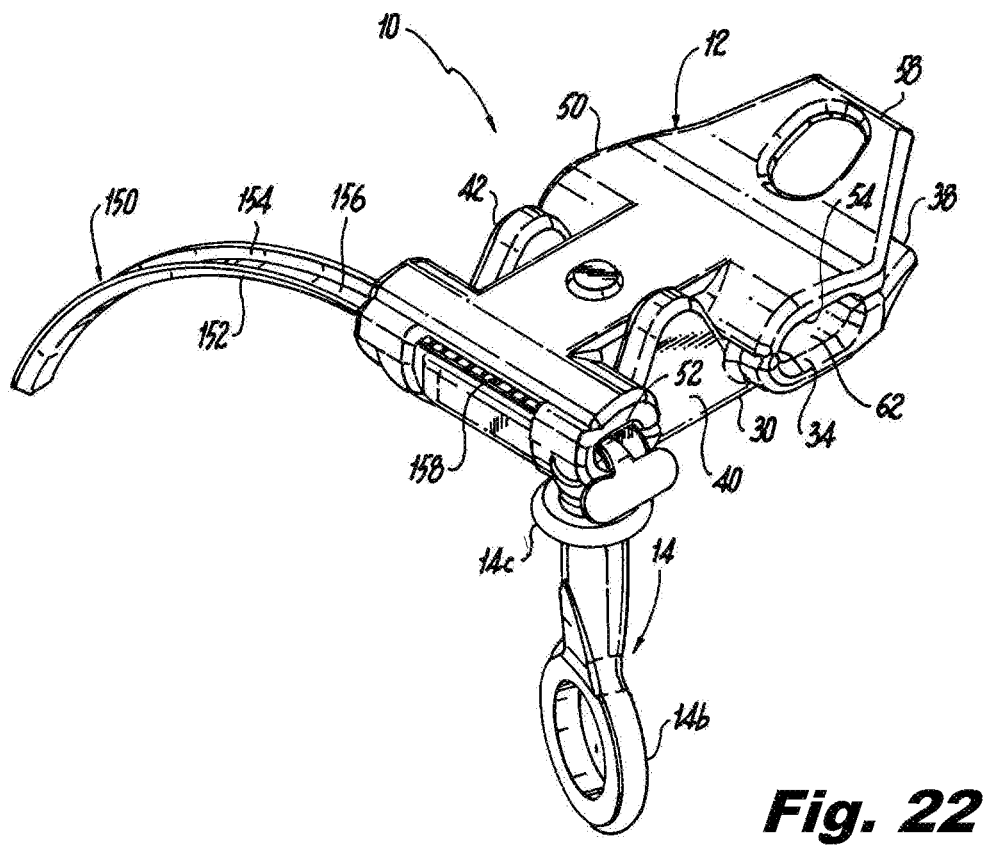
FIG. 22 is a top perspective view of another exemplary embodiment of a cable clamp according to the present disclosure illustrating the shim of FIG. 18 incorporated into the cable clamp of FIG. 1 with the cable clamp in the clamping position.
Figure 23:
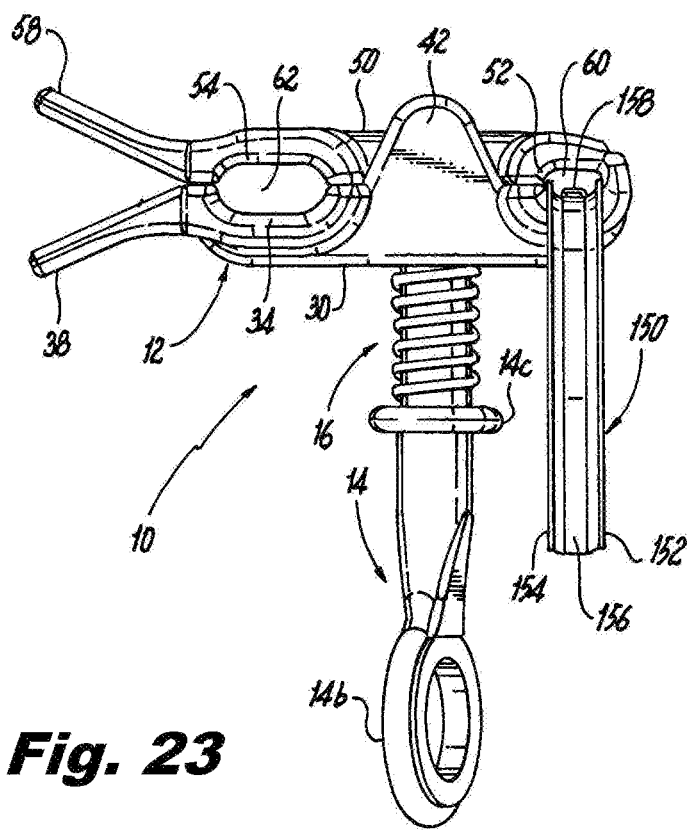
FIG. 23 is a left side elevation view of the cable clamp of FIG. 22.
Figure 24:
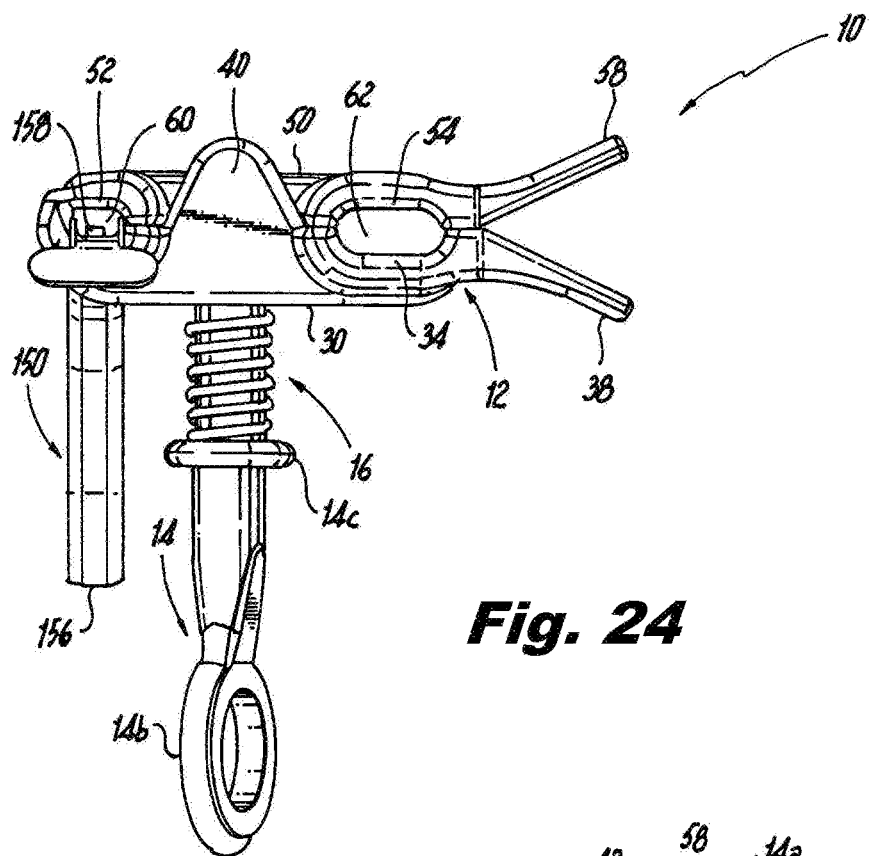
FIG. 24 is a right side elevation view of the cable clamp of FIG. 22.
Figure 25:
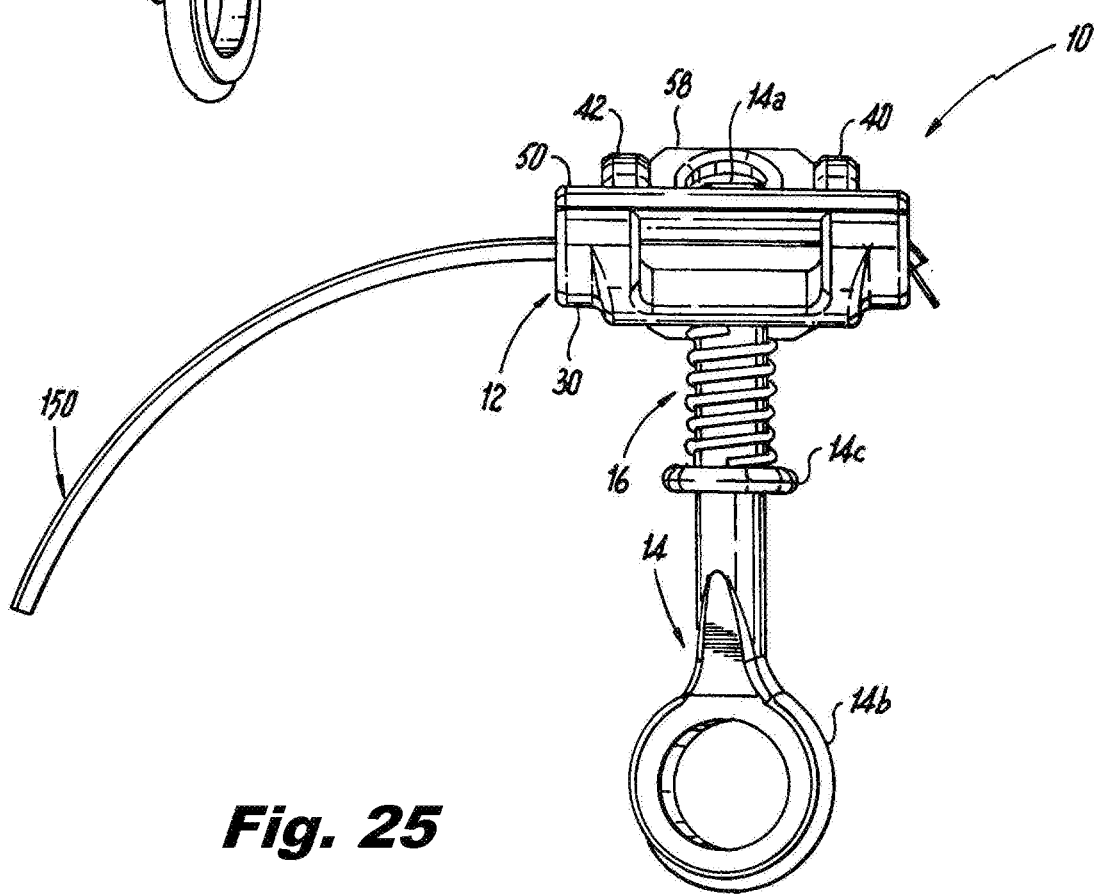
FIG. 25 is a front elevation view of the cable clamp of FIG. 22.

Referring now to FIGS. 7-12, to attach a drop cable 100 to the clamp 10, a user, e.g., a technician, pinches together the lower lever arm 38 and the upper lever arm 58, as seen by arrows A and B in FIG. 8, such that the drop cable section 20 and the intermediate section 22 of the lower body half 30 pivot downward towards the eye 14b in the stem 14, while the upper body half 50 remains substantially perpendicular to the stem 14, as shown in FIG. 8. By pinching the lower lever arm 38 and the upper lever arm 58 together, the body 12 is moved to a first open position where the opening 60 formed by the drop grooves 32 and 52 becomes accessible so that a drop cable 100 can be inserted into the opening 60 and the spring 16 compresses. The drop cable 100 is then inserted into the drop grooves and lower lever arm 38 and the upper lever arm 58 are released. When the lower lever arm 38 and the upper lever arm 58 are released, the force compressing the spring 16 is released and the spring biases the lower body half 30 toward the upper body half 50 returning the body 12 to the clamping position providing a clamping force to at least temporarily holding the drop cable 100 within the opening 60. The clamp 10 is then releasably attached to an extendable reach tool, e.g., a hot stick, (not shown) using the eye 14b in the stem 14. A technician can then attach the main span section 24 of the clamp 10 to a main span cable 200 by snapping the main span cable 200 into the opening 62 in the main span section 24 of the body 12. More specifically, and referring to FIGS. 11 and 12, the main span cable is first positioned between the lower lever arm 38 and the upper lever arm 58. The clamp 10 is then forced against the main span cable 200 so that the lower body half 30 pivots in the direction of arrow C separating the main span section 24 of the lower body half 30 from the main span section 24 of the upper body half 50 until the main span section 24 of the body 12 is in a second open position allowing the main span cable 200 to pass into the opening 62 in the main span section 24 of the body. Separating the lower body half 30 from the upper body half 50 also compresses the spring 16. Once the main span cable 200 passes into the opening 62 on the main span section 24 of the body 12 the force compressing the spring 16 is released so that the spring biases the lower body half 30 toward the upper body half 50 such that the body 12 returns to the clamping position providing a clamping force to at least temporarily holding the main span cable 200 within the opening 62 and the drop cable 100 within the opening 60. The drop cable 100 is then tensioned. For example, the drop cable can be tensioned a plurality of teeth, e.g., a plurality of one-way teeth, within the drop cable groove 32 of the lower body half 30 or in the drop cable groove 52 of the upper body half 50. In the embodiment shown in FIG. 7, the plurality of teeth 37 are in the drop cable groove 32 of the lower body half 30. The teeth 37 allow the drop cable 100 to pass through the opening 60 imparting little resistance to the forward advancement of a drop cable through the drop cable opening 60 while imparting sufficient resistance to rearward movement of the drop cable to prevent rearward withdrawal of the drop cable 100 from the drop cable opening 60. Once the drop cable 100 is properly tensioned, the stem 14 is tightened by rotating the stem clockwise which is translated to movement of the lower body half 30 relative to the upper body half 50 to lock the drop cable 100 and main span cable 200 in place within the clamp 10, as shown in FIGS. 13-17. It is noted that the cable openings 60 and 62 are configured so that when the two body halves 30 and 50 are in the clamping position the cable openings bottom out preventing the exertion of excessive force to the drop cable 100 and/or main span cable 200 crushing and possibly damaging the cable no matter how much torque is applied to the stem 14. More specifically, and referring to FIG. 2, when the two body halves 30 and 50 come together the height H1 of cable opening 60 is defined by the flat surface 33 on the lower body half 30 and the flat surface 53 on the upper body half 50. Similarly, the height H2 of cable opening 62 is defined by the flat surfaces 35 and 37 on the lower body half 30 and the flat surface 55 and 57 on the upper body half 50. The height H1 and H2 can be set so that there is suitable clamping of a cable inserted in the cable openings 60 and 62, and possibly permitting a certain amount of jacket deflection in the cable, without crushing the cable within the opening to a point causing, for example, an attenuation increase resulting in a signal loss, and/or mechanical damage to the fiber within the cables 100 and 200.

In instances where the drop cable needs to maintain a specified bend radius, a shim can be incorporated into the clamp of the present disclosure that ensures that the specified bend radius is not exceeded. An example of such instances is with fiber optic cable, where the fiber optic cable should not exceed a specified bend radius so as not to risk creating a signal loss in the fibers. The shim according to the present disclosure supports the drop cable and ensures that the specified bend radius of the drop cable is not exceeded.

Referring now to FIGS. 18-21, an exemplary embodiment of a shim according to the present disclosure is shown. In this exemplary embodiment, the shim 150 is U-shaped member having two side walls 152 and 154 joined by a base 156. For general reference purposes, the shim 150 is described with three sections; a curved section 160, a flat section 162 and a termination section 164. The curved section 160 has a specified radius or curvature that corresponds to a specified radius of curvature that the drop cable 100 should have. The flat section 162 is configured to fit within the clamp 10 the shim is to be used with, and the termination section 164 provides a rounded end that permits the drop cable 100 to extend out of the clamp for connection to the main span cable 200. The flat section 162 of the shim 150 may include a plurality of teeth 158 to allow the drop cable to slide in one direction within the shim 150, i.e., imparting little resistance to the forward advancement of a drop cable through the drop cable opening 60, while imparting sufficient resistance to rearward movement of the drop cable to prevent rearward withdrawal of the drop cable from the drop cable opening. When installing the drop cable 100 into the drop cable opening 60 and the shim 150, tensioning the drop cable is achieved by sliding the drop cable forward within the drop cable opening. The plurality of teeth 158 bite into the cable jacket to prevent rearward cable tension from loosening if the drop cable 100 is pulled rearward.

Referring now to FIGS. 22-25, an exemplary embodiment of a clamp according to the present disclosure incorporating a shim according to the present disclosure are shown. In this embodiment, the clamp 10 is the same as the clamp described above and for ease of description is not repeated. Similarly, the shim 150 is the same as the shim described above and for ease of description is not repeated. In this exemplary embodiment, the shim 150 is mounted within the drop cable groove 32 of the lower body half 30, as shown in FIGS. 22-25, using, for example, adhesives, welds or mechanical fasteners.

Figure 26:
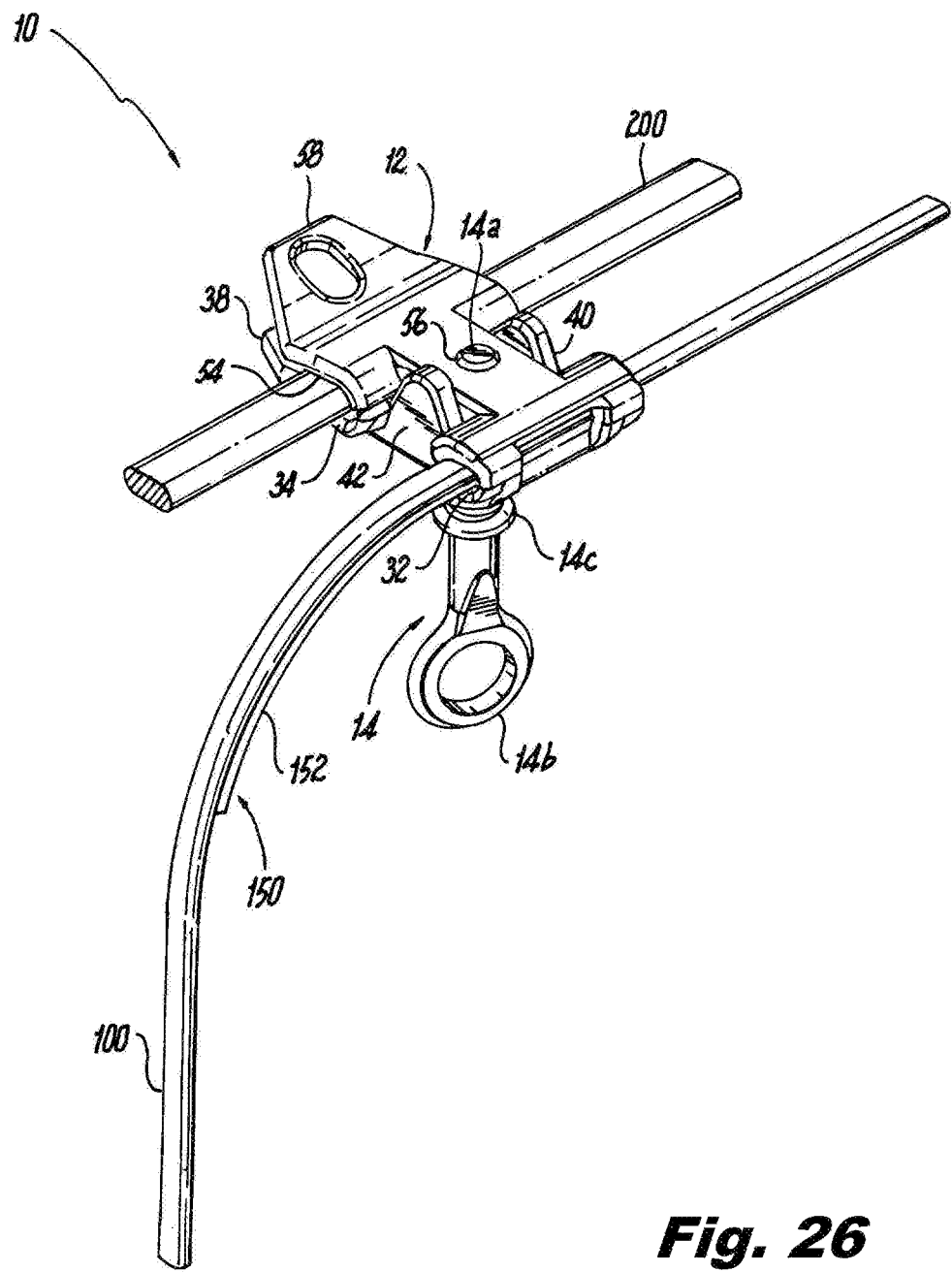
FIG. 26 is a top perspective view of the cable clamp of FIG. 22 in the clamping position, with a main span cable in a main span cable section of the cable clamp, and a drop cable in a drop cable side of the cable clamp.
Figure 27:
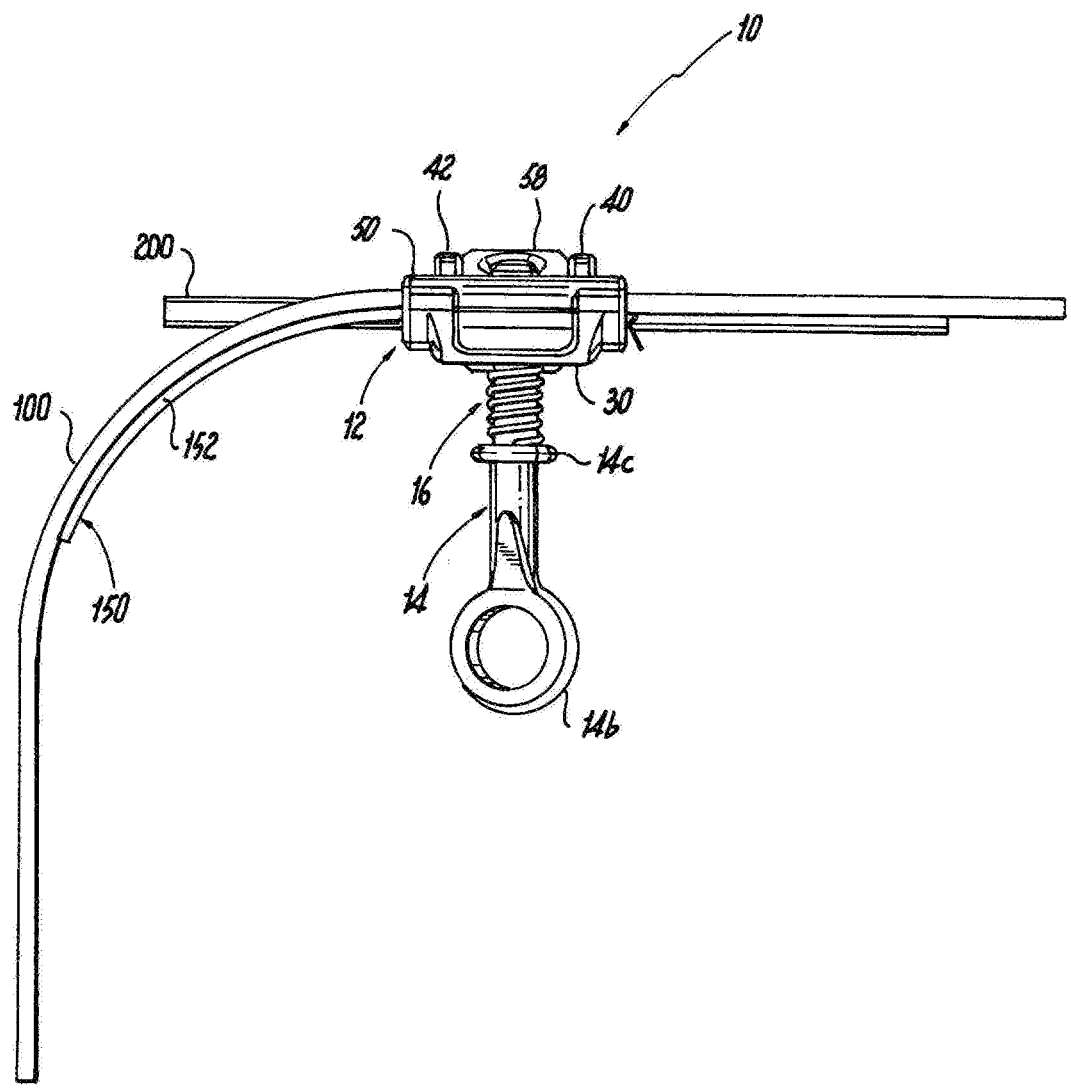
FIG. 27 is a front elevation view of the cable clamp, main span cable and drop cable of FIG. 26.
Figure 28:
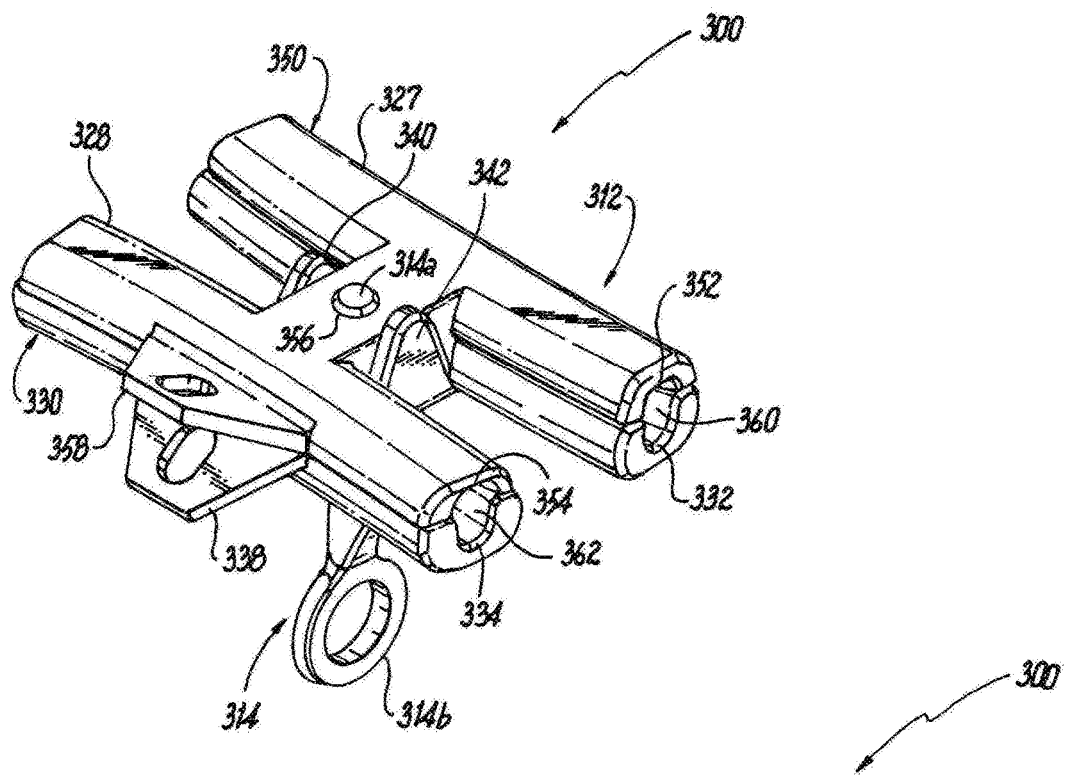
FIG. 28 is a top perspective view of another exemplary embodiment of a cable clamp according to the present disclosure illustrating the cable clamp in a clamping position.
Figure 29:
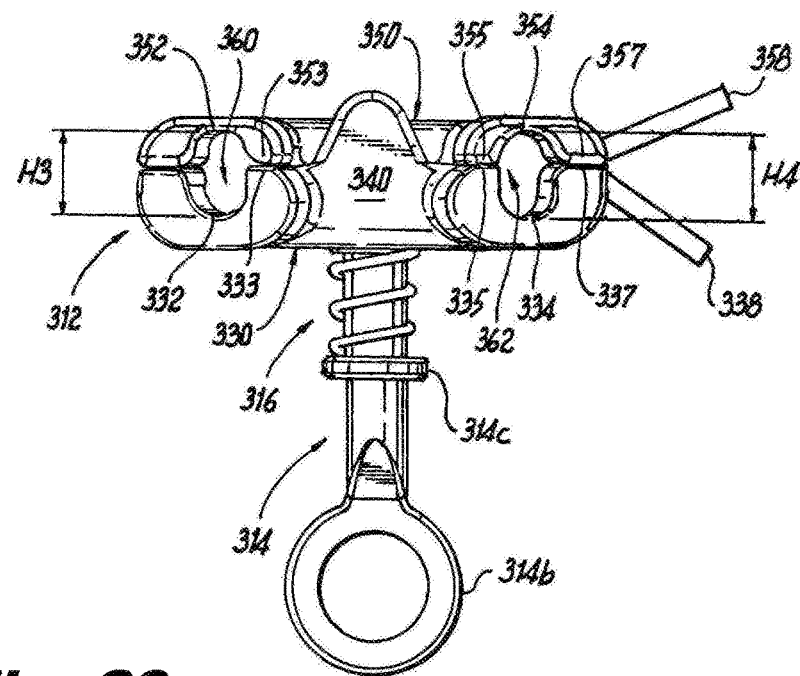
FIG. 29 is a side elevation view of the cable clamp of FIG. 28.
Figure 30:
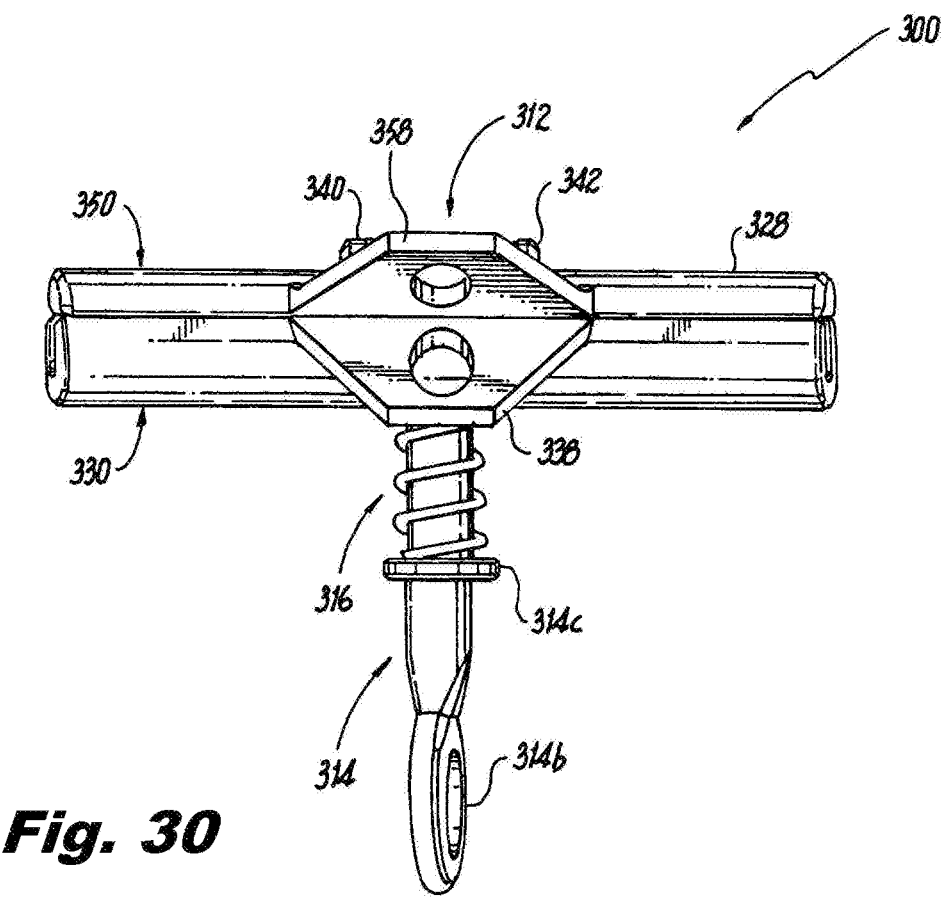
FIG. 30 is a rear elevation view of the cable clamp of FIG. 28.
Figure 31:
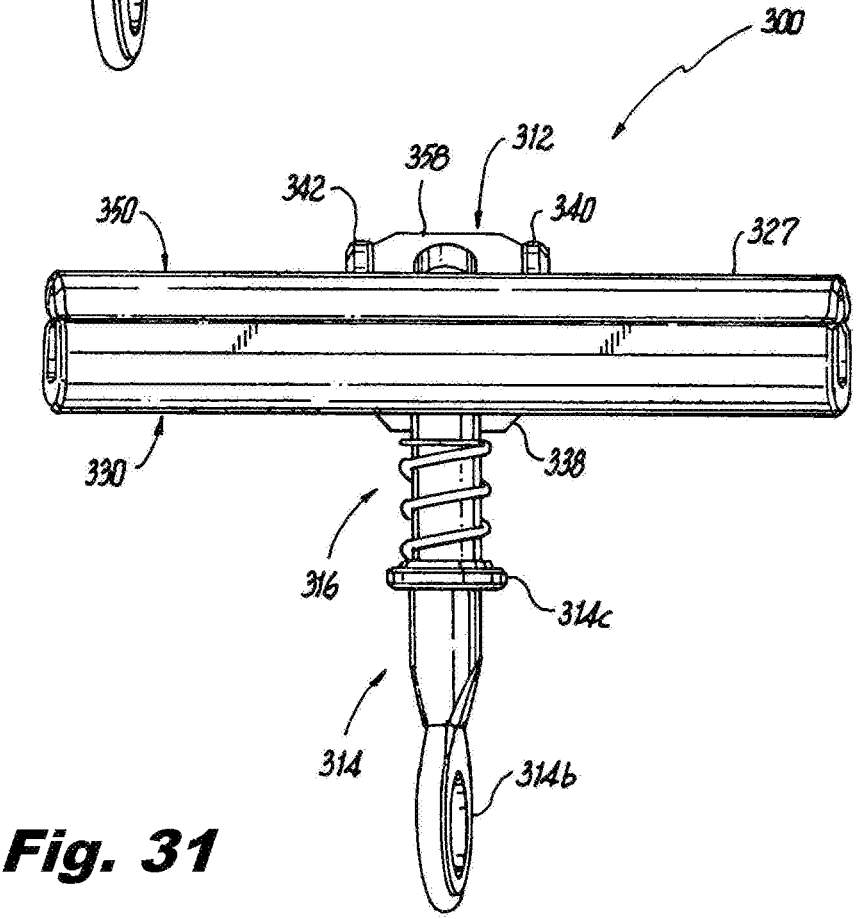
FIG. 31 is a front elevation view of the cable clamp of FIG. 28.

Referring now to FIGS. 26 and 27, to attach a drop cable 100 to the clamp 10, a user, e.g., a technician, pinches together the lower lever arm 38 and the upper lever arm 58 such that the drop cable section 20 and the intermediate section 22 of the lower body half 30 pivot downward towards the eye 14b in the stem 14, while the upper body half 50 remains substantially perpendicular to the stem 14, as shown in FIG. 8. By pinching the lower lever arm 38 and the upper lever arm 58 together, the body 12 moves to the first open position where the opening 60 formed by the drop grooves 32 and 52 becomes accessible so that the drop cable 100 can be inserted into the opening 60 and the spring 16 compresses. The drop cable 100 is then inserted into the flat section 162 of the shim 150 sitting in drop groove 32 of the lower body half 30. The lower lever arm 38 and the upper lever arm 58 are then released such that the force compressing the spring 16 is released, and the spring biases the lower body half 30 toward the upper body half 50 returning the body 12 to the clamping position providing a clamping force to at least temporarily holding the drop cable 100 within the opening 60 and the shim 150. The drop cable 100 is also positioned within the curved section 160 of the shim 150, i.e., within the portion of the U-shaped member forming the curved section 160 of the shim, to maintain a radius of curvature of the drop cable. The clamp 10 is then releasably attached to an extendable reach tool, e.g., a hot stick, (not shown) using the eye 14b in the stem 14. A technician can then attach the main span section 24 of the clamp 10 to a main span cable 200 by snapping the main span cable 200 into the opening 62 in the main span section 24 of the body. More specifically, and referring again to FIGS. 11 and 12, the main span cable is first positioned between the lower lever arm 38 and the upper lever arm 58. The clamp 10 is then forced against the main span cable 200 so that the lower body half 30 pivots in the direction of arrow C separating the main span section 24 of the lower body half 30 from the main span section 24 of the upper body half 50 until the main span section 24 of the body 12 is in the second open position allowing the main span cable 200 to pass into the opening 62 in the main span section 24 of the body. Separating the lower body half 30 from the upper body half 50 also compresses the spring 16. Once the main span cable passes into the opening 62 on the main span section 24 of the body the force compressing the spring 16 is released so that the spring biases the lower body half 30 toward the upper body half 50 returning the body 12 to the clamping position providing a clamping force to at least temporarily holding the main span cable 200 within the opening 62 and the drop cable 100 within the opening 60. The drop cable 100 is then tensioned using the teeth 158 in the shim 150 that impart little resistance to the forward advancement of a drop cable through the drop cable opening 60, while imparting sufficient resistance to rearward movement of the drop cable to prevent rearward withdrawal of the drop cable from the drop cable opening. Once the drop cable 100 is properly tensioned, the stem 14 is tightened by rotating the stem clockwise which is translated to movement of the lower body half 30 relative to the upper body half 50 to lock the drop cable 100 and main span cable 200 in place within the clamp 10, as shown in FIGS. 26 and 27.

Referring now to FIGS. 28-37, another exemplary embodiment of the clamp according to the present disclosure is shown. The clamp 300 includes a body 312, a stem 314 and a spring 316. The body 312 will be described in more detail below. The stem 314 is preferably an eyestem that has a threaded end 314a, an eye 314b for coupling the clamp 300 with an extendable reach tool, for example, a hot stick, and a collar 314c for supporting the spring 316. The body 312, stem 314 and spring 316 may be made of, for example, a metallic material, such as aluminum, cast aluminum, galvanized steel or stainless steel, or a combination of metallic materials. In another exemplary embodiment, the body 312, stem 314 and spring 316 may be made of a non-metallic material, such as rigid plastic or composite materials e.g., carbon fiber.

Figure 32:
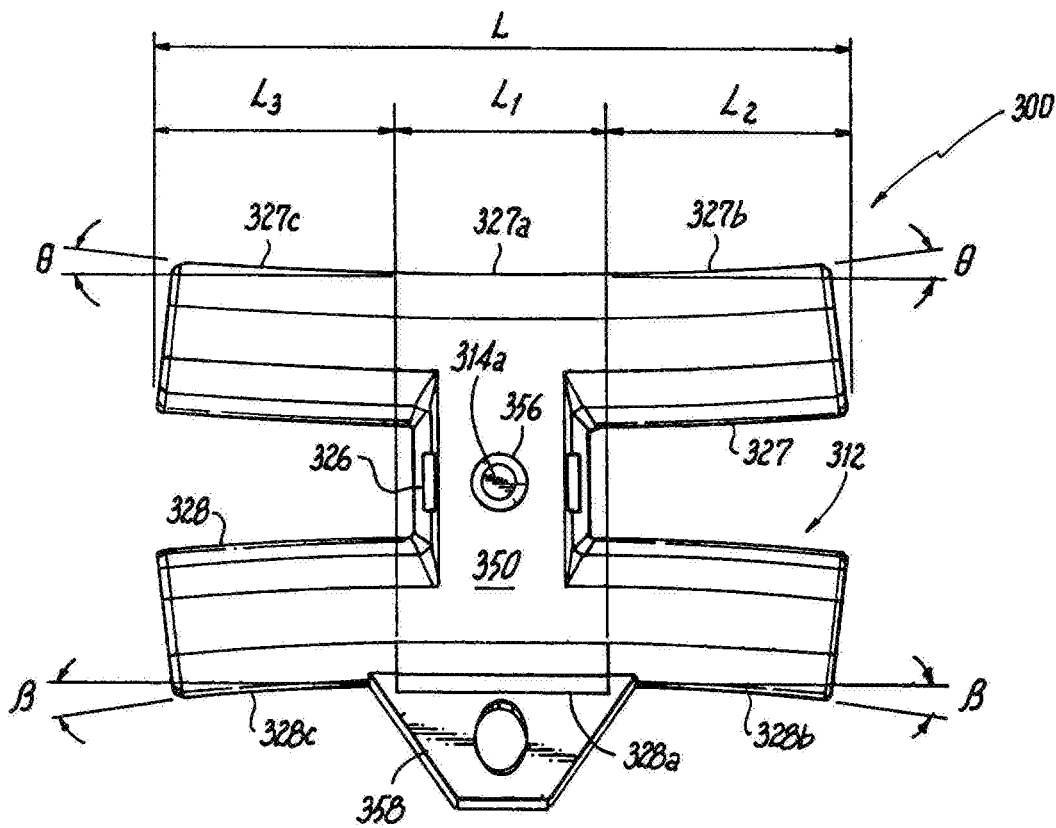
FIG. 32 is a top plan view of the cable clamp of FIG. 28.
Figure 33:
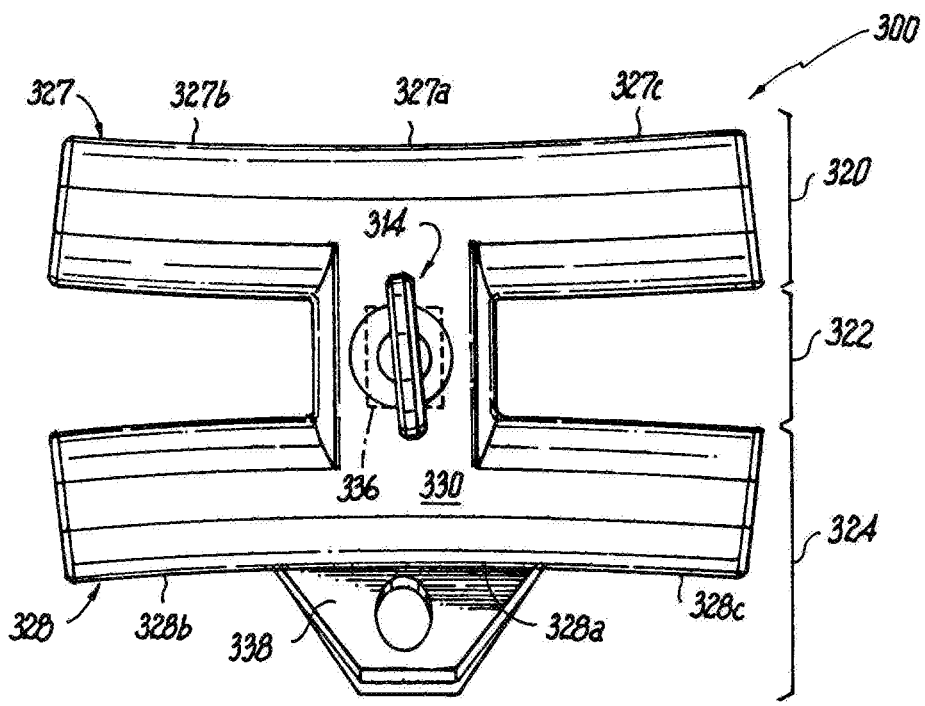
FIG. 33 is a bottom plan view of the cable clamp of FIG. 28.

For the purpose of reference, the body 312 can be divided into three sections; a drop cable section 320, an intermediate section 322 and a main span cable section 324, seen in FIG. 33. The body 312 includes a lower body half 330 and an upper body half 350 that are releasably secured to each other by the stem 314 and the spring 316 and at least partially movable relative to each other. In this exemplary embodiment, and referring to FIGS. 32 and 33, each of the lower body half 330 and the upper body half 350 when in a clamping position, seen in FIG. 29, form an H-like shape having a main body section 326 in the intermediate section 322, an elongated drop cable guide 327 in the drop cable section 320, and an elongated main span cable guide 328 in the main span cable section 324. The elongated drop cable guide 327 includes a central section 327a, a first extension section 327b extending from one side of the central section and a second extension section 327c extending from another side of the central section. Similarly, the elongated main span cable guide 328 includes a central section 328a, a first extension section 328b extending from one side of the central section and a second extension section 328c extending from another side of the central section.

Referring to FIGS. 32-37, the dimensions of the drop cable guide 327 and the main span cable guide 328 are sufficient to support a main span cable and a drop cable respectively. Thus, the dimensions of the guides may be the same or they may differ. In the exemplary embodiment shown, the drop cable guide 327 has a length L, seen in FIG. 32, sufficient to support a drop cable, and the main span cable guide 328 has a length L sufficient to support a main span cable. In the embodiment shown, the length of each guide is the same. As a non-limiting example, a range for the length of each guide may be from about 3 inches to about 8 inches and is preferably about 5.0 inches.

For the purpose of reference, the length of drop span guide 327 may be divided into three components where the central section 327a has a length $L_1$, seen in FIG. 32, the first extension section 327b has a length $L_2$ and the second extension section 327c has a length $L_3$. As a non-limiting example, the length of the central section 327a may be in the range from about 1.0 inch to about 3 inches and is preferably about 1.5 inches. The length of each extension 327b and 327c may be the same or they may differ. As a non-limiting example, if the length L of the drop cable guide 327 is about 5.0 inches and the length $L_1$ of the central section 327a is about 1.5 inches, the length of the extension sections 327b and 327c may both be about 1.75 inches. As another non-limiting example, if the length L of the drop cable guide 327 is about 5.0 inches and the length $L_1$ of the central section 372a is about 1.5 inches, the length $L_2$ of the first extension section 327b may be about 2.5 inches and the length $L_3$ of the second extension section 327c may be about 1.0 inch. The drop cable guide 327 may be a straight structure, a flared structure, a curved structure, or an irregular shaped structure. In the exemplary embodiment shown, the drop cable guide 327 can be a flared structure where the central section 327a is substantially straight and each extension section 327b and 327c is flared such that a radius of curvature of the flare (represented by the dotted lines and angle "θ" in FIG. 32) of each extension section is in the range from about 3.5 inches and about 20 inches, and is preferably about 15 inches. The flared extension sections 327b and 327c flare the drop cable away from the main span cable to decrease the bend strain on the main span cable. More specifically, the flared drop cable applies a load on the main span cable that is substantially perpendicular to the preferred bend axis of the main span cable thus decreasing the bend strain on the main span cable.

For reference purposes, the length of the main span cable guide 328 may be divided into three components where the central section 328a has a length $L_1$, the first extension section 328b has a length $L_2$ and the second extension section 328c has a length $L_3$. As a non-limiting example, the length of the central section may be in the range from about 1.0 inch to about 3 inches and is preferably about 1.5 inches. The length of each extension 328b and 328c may be the same or they may differ. As a non-limiting example, if the length L of the main span cable guide 328 is about 5.0 inches and the length $L_1$ of the central section 328a is about 1.5 inches, the length of the extension sections 328b and 328c may both be about 1.75 inches. As another non-limiting example, if the length L of the main span cable guide 328 is about 5.0 inches and the length $L_1$ of the central section 328a is about 1.5 inches, the length $L_2$ of the first extension section 328b may be about 2.5 inches and the length $L_3$ of the second extension 328c section may be about 1.0 inch. The main span cable guide 328 may be a straight structure, a flared structure, a curved structure, or an irregular shaped structure. In the exemplary embodiment shown, the main span cable guide 328 is a flared structure where the central section 328a is substantially straight and each extension section 328b and 328c is flared such that a radius of curvature of the flare (represented by the dotted lines and angle "β" in FIG. 32) of each extension section is in the range from about 3.5 inches and about 20 inches, and is preferably about 15 inches. The flared extension sections 328b and 328c flare the main span cable away from the drop cable to decrease the bend strain on the main span cable.

Figure 36:
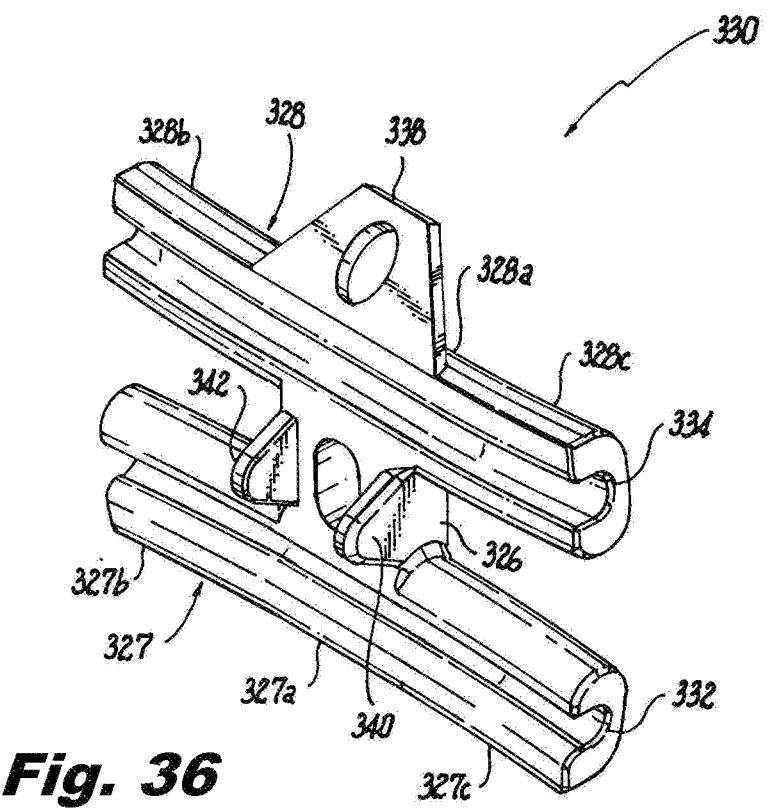
FIG. 36 is a top perspective view of a lower body half of the cable clamp according to the present disclosure.
Figure 37:
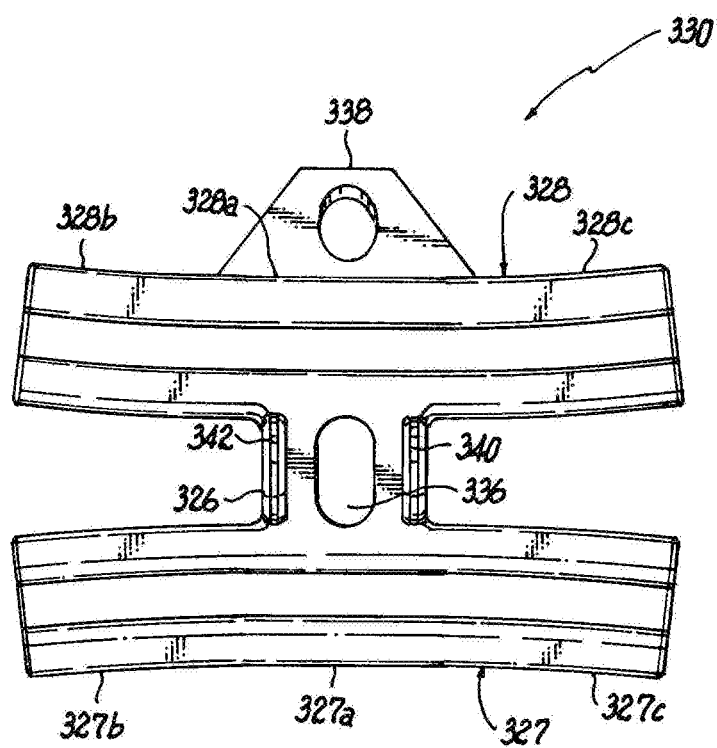
FIG. 37 is top plan view of the lower body half of FIG. 36.

Referring to FIGS. 36 and 37, the lower body half 330 has a drop cable groove 332 in the drop cable guide 327 and a main span cable groove 334 in the main span cable guide 328. The main body section 326 of the lower body 330 between the drop cable groove 332 and the main span cable groove 334 has an oblong opening 336 that permits the stem 314 to pass through the lower body half 330 and allows the lower body half 330 to pivot on the stem 314 relative to the upper body half 350. The lower body half 330 also has a lower lever arm 338 extending from the main span cable guide 328, as shown. The lower lever arm 338 is preferably at an angle relative to the lower body half 330. The lower lever arm 338 is used when attaching cables to the clamp 300, as will be described below. Extending from the main body section 326 of the lower body half 330 toward the upper body half 350 are two stabilizing arms 340 and 342 that with the main body section 326 of the lower body half 330 form a cradle in which the upper body half 350 sits. The stabilizing arms 340 and 342 also prevent rotational or lateral movement of the lower body half 330 relative to the upper body half 350 when installing the clamp 300 on a main span cable or drop cable.

Figure 34:
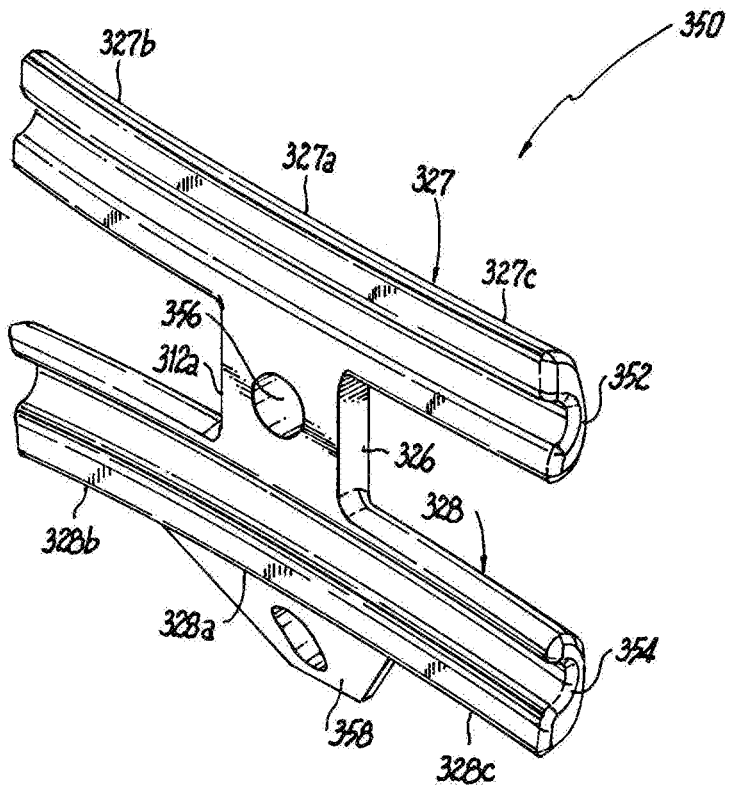
FIG. 34 is a bottom perspective view of an upper body half of the cable clamp according to the present disclosure.
Figure 35:
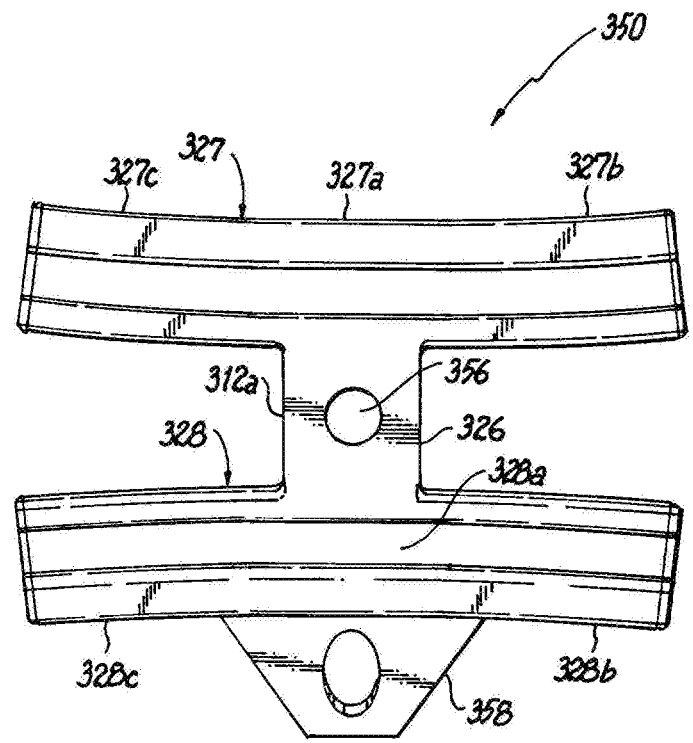
FIG. 35 is top plan view of the upper body half of FIG. 34.

Referring to FIGS. 34 and 35, the upper body half 350 has a drop cable groove 352 in the drop cable guide 327 and a main span cable groove 354 in the main span cable guide 328. The main body section 326 of the upper body 350 between the drop cable groove 352 and the main span cable groove 354 is configured so that the main body section 326 of the upper body half sits between the stabilizing arms 340 and 342 of the lower body half 330. The main body section 326 of the upper body half 350 has a threaded opening 356 that is aligned with the oblong opening 336 on the lower body half 330. The threaded portion of the stem 314 with the spring 316 can be passed through the oblong opening 336 and threaded into the threaded opening 356 to releasably couple the lower body half 330 to the upper body half 350. The upper body half 350 has an upper lever arm 358 extending from the main span cable guide 328 of the upper body half, as shown. The upper lever arm 358 is preferably at an angle relative to the upper body half 350. The upper lever arm 358 is used when attaching cables to the clamp 300, as will be described below.

Thus, the clamp 300 has two body halves 330 and 350 that when coupled together by the stem 314 and spring 316 are configured to hold a main span cable and a drop cable. More specifically, the spring 316 is held between the lower body half 330 and the collar 314c on the stem 314 and when the clamp 300 is in a clamping position, seen in FIG. 29. In the clamping position, a clamping force generated by the spring 316 keeps the lower body half 330 and the upper body half 350 coupled together. When the two body halves 330 and 350 are in the clamping position, the drop cable grooves 332 and 352 in the drop cable guide 327 of the body 312 form a drop cable opening 360 for receiving a drop cable. Similarly, when the two body halves 330 and 350 are in the clamping position, the main span cable grooves 334 and 354 in the main span cable guide 328 of the body 312 form a main span cable opening 362 for receiving a main span cable.

Figure 38:
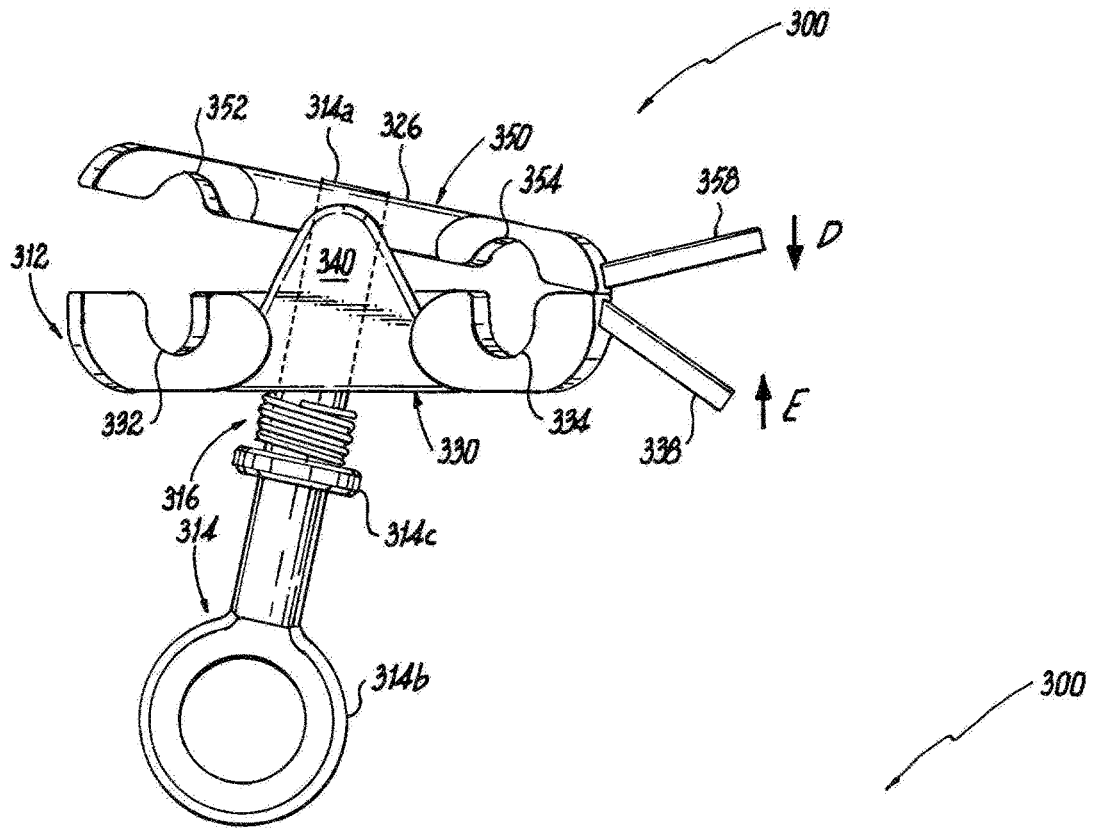
FIG. 38 is a side elevation view of the cable clamp of FIG. 29, illustrating a drop cable section of the cable clamp in a first open position, and the drop cable within the drop cable opening in the cable clamp.
Figure 39:
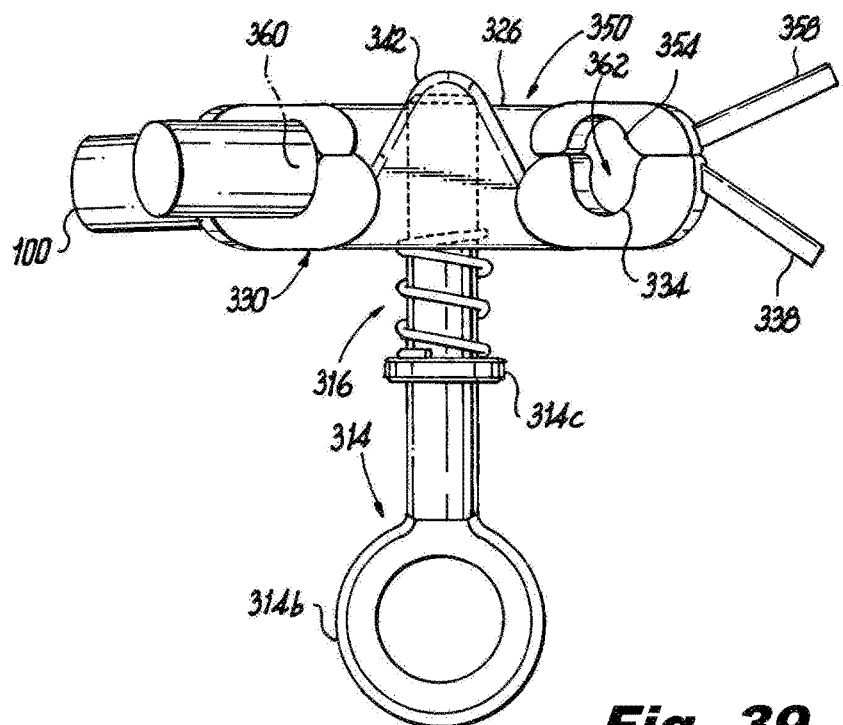
FIG. 39 is a side elevation view of the cable clamp similar to FIG. 29, illustrating a drop cable within the drop cable opening in the cable clamp and the drop cable section of the cable clamp in a clamping position.
Figure 40:
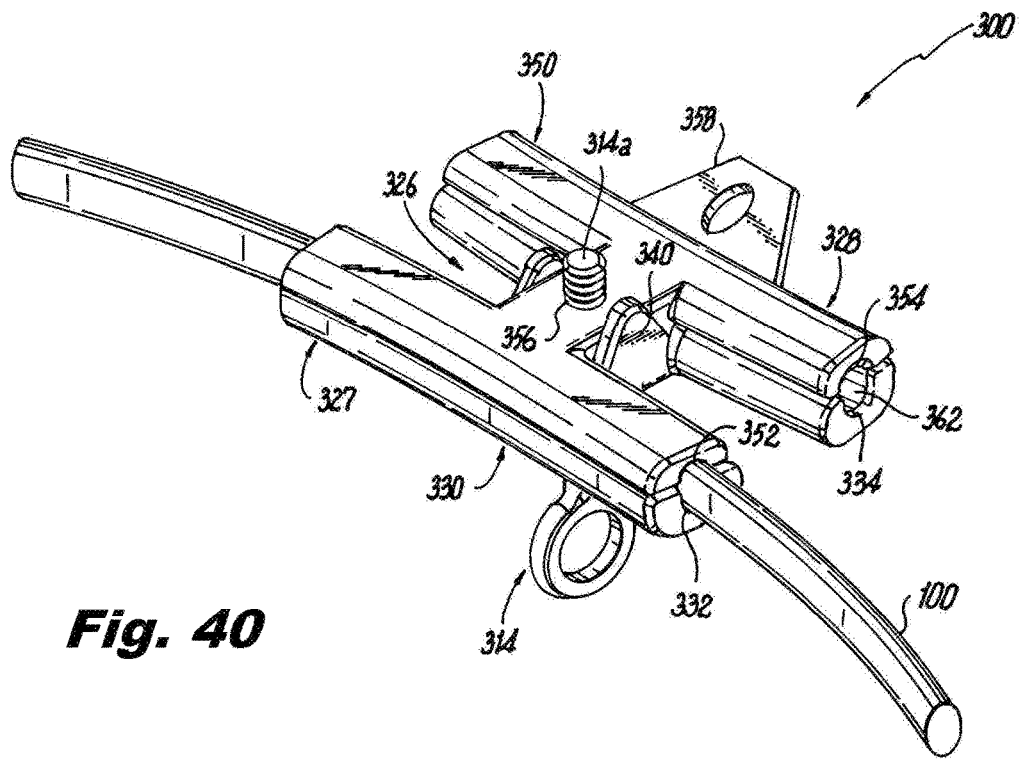
FIG. 40 is a top perspective view of the cable clamp of FIG. 39 illustrating the drop cable within the drop cable opening in the cable clamp and the drop cable section of the cable clamp in a clamping position.
Figure 41:
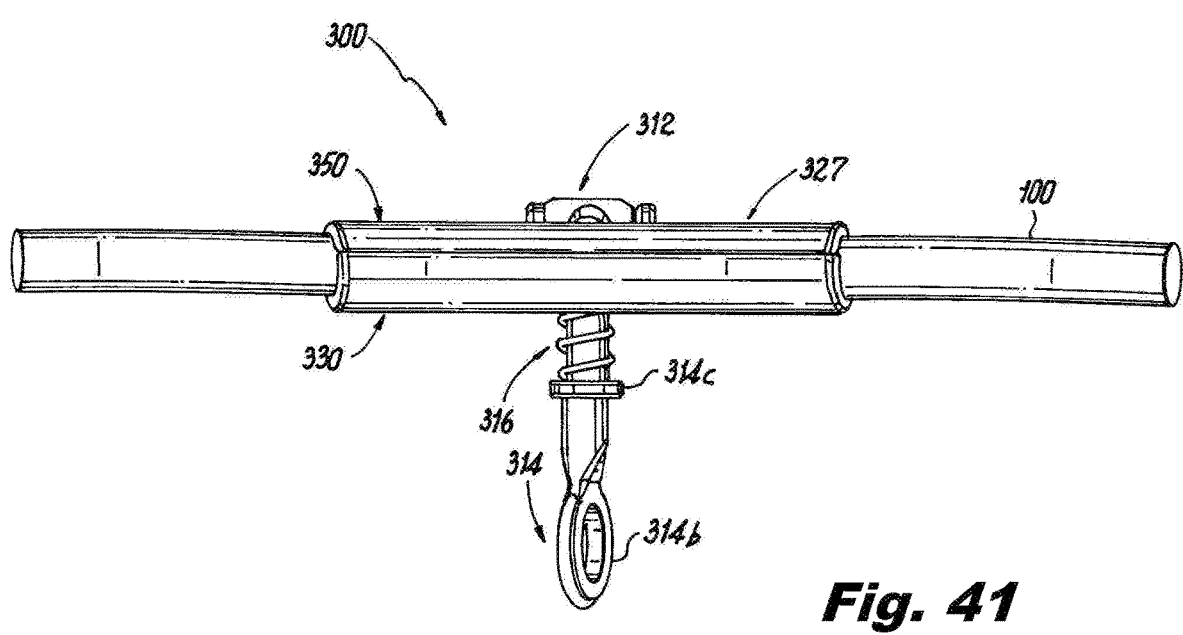
FIG. 41 is a front elevation view of the cable clamp of FIG. 39, illustrating the drop cable within the drop cable opening in the cable clamp and the cable clamp in the clamping position.
Figure 42:
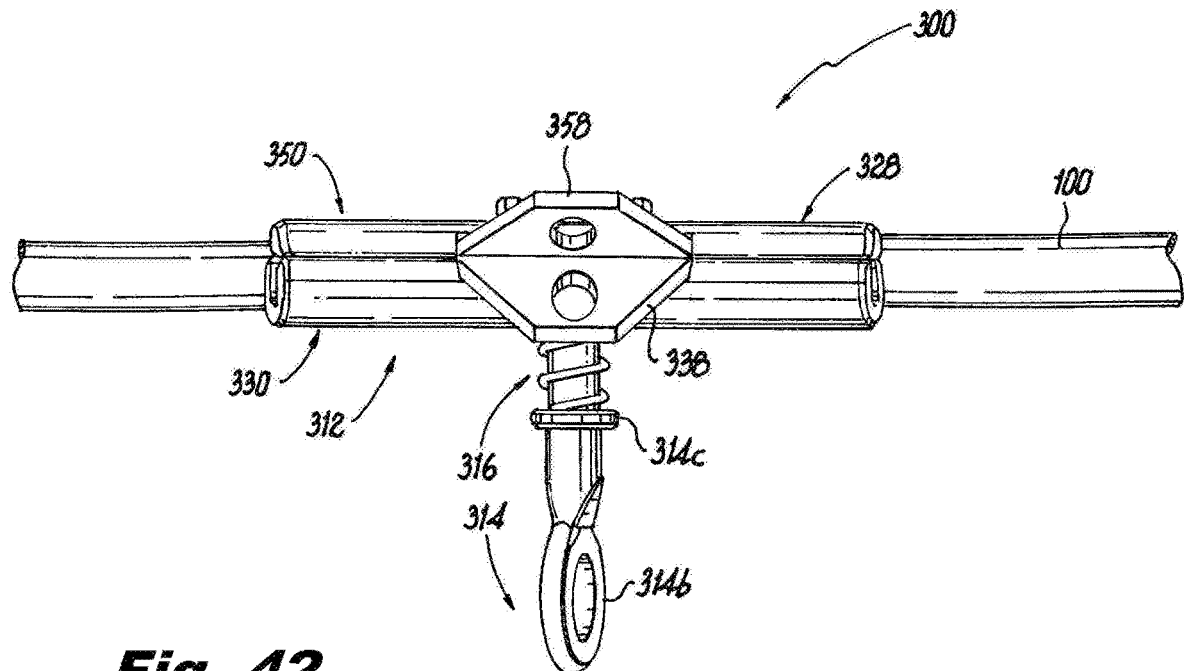
FIG. 42 is a rear elevation view of the cable clamp of FIG. 39, illustrating the drop cable within the drop cable opening in the cable clamp and the cable clamp in the clamping position.

Referring now to FIGS. 38-42, to attach a drop cable 100 to the clamp 300, a user, e.g., a technician, pinches together the lower lever arm 338 and the upper lever arm 358, seen by arrows D and E in FIG. 38, such that the drop cable guide 327 and the main body section 326 of the lower body half 330 pivot downward towards the eye 314b in the stem 314, while the upper body half 350 remains substantially perpendicular to the stem 314, as shown. By pinching the lower lever arm 338 and the upper lever arm 358 together, the body 312 is moved to a first open position where the opening 360 formed by the drop grooves 332 and 352 becomes accessible so that a drop cable 100 can be inserted into the opening 360. In the first open position, seen in FIG. 38, the spring 316 is compressed. The drop cable 100 is then inserted into the drop cable grooves and lower lever arm 338 and the upper lever arm 358 are released. When the lever arms 338 and 358 are released, the force compressing the spring 316 is released and the spring biases the lower body half 330 toward the upper body half 350 returning the body 312 to the clamping position, seen in FIGS. 39-42. As noted, the spring 316 provides a clamping force to at least temporarily hold the drop cable 100 within the opening 360.

Figure 43:
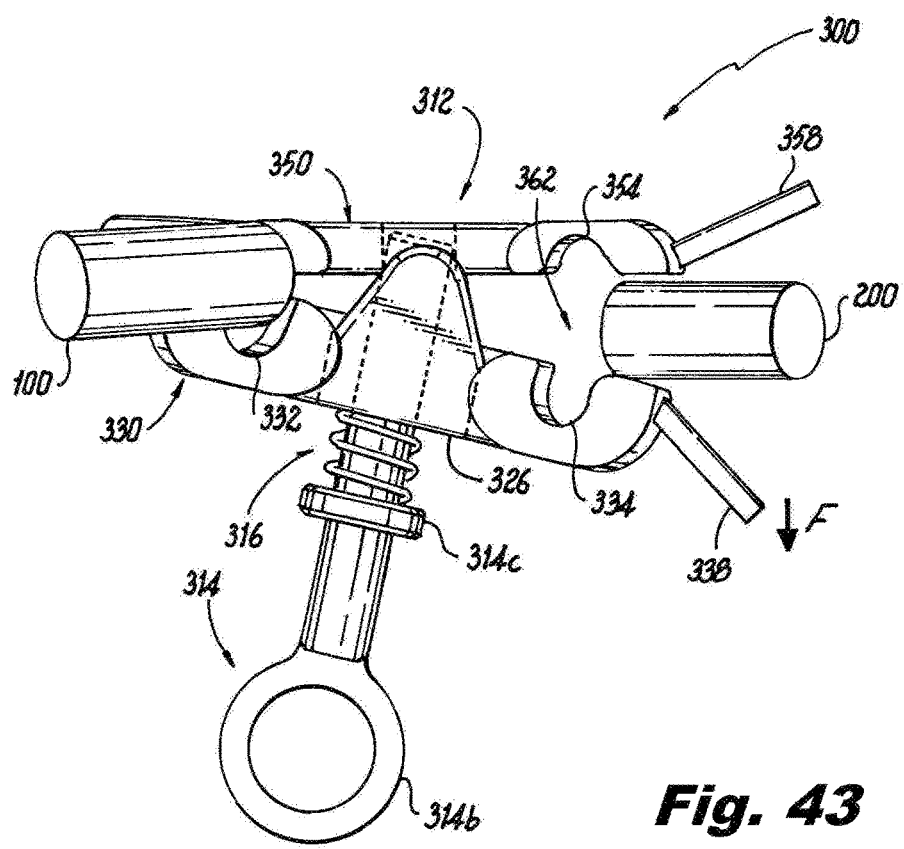
FIG. 43 is a side elevation view of the cable clamp of FIG. 39, illustrating a drop cable in a drop cable section of the cable clamp in a clamping position, and a main span cable moving the body to a second open position where a main span cable opening of a main span cable section of the cable clamp is accessible.
Figure 44:
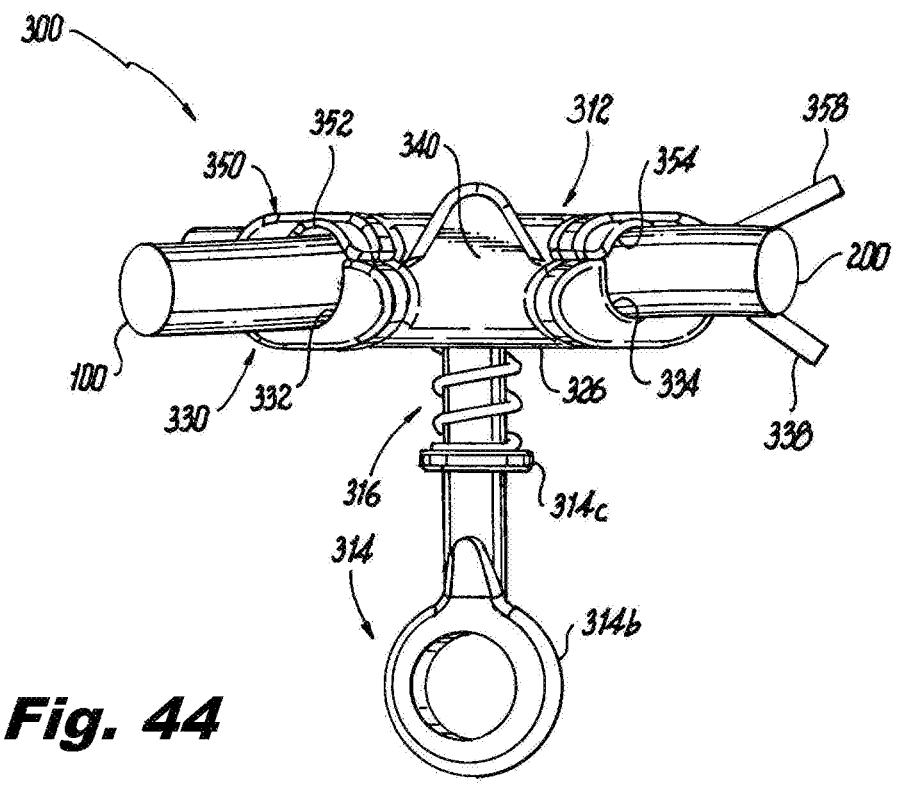
FIG. 44 is a side elevation view of the cable clamp of FIG. 39, illustrating a drop cable in a drop cable section of the cable clamp in a clamping position, and a main span cable in a main span cable section of the cable clamp in a clamping position.

The clamp 300 is then releasably attached to an extendable reach tool, e.g., a hot stick, (not shown) using the eye 314b in the stem 314. With the clamp 300 attached to extendable reach tool, a technician can then attach the main span cable guide 328 of the clamp 300 to a main span cable 200 by snapping the main span cable 200 into the opening 362 in the main span cable guide 328 of body 312. More specifically, and referring to FIGS. 43 and 44, the main span cable is first positioned between the lower lever arm 338 and the upper lever arm 558. The clamp 300 is then forced against the main span cable 200 so that the lower body half 330 pivots in the direction of arrow F separating the main span cable guide 328 of the lower body half 330 from the main span cable guide 328 of the upper body half 350 until the main span cable guide 328 of the body 312 is in a second open position, seen in FIG. 43. With the body 312 in the second open position, the main span cable 200 can pass into the opening 362 in the main span cable guide 328. Separating the lower body half 330 from the upper body half 350 also compresses the spring 316. Once the main span cable 200 passes into the opening 362 in the main span cable guide 328, the force compressing the spring 316 is released so that the spring biases the lower body half 330 toward the upper body half 350 such that the body 312 returns to the clamping position, seen in FIG. 44. With the body 312 in the clamping position, a clamping force exerted by the spring 316 at least temporarily holds the main span cable 200 within the opening 362 and the drop cable 100 within the opening 360.

The drop cable 100 is then tensioned as described above. For example, the drop cable 100 can be tensioned using a plurality of teeth, e.g., a plurality of one-way teeth, within the drop cable groove 332 of the lower body half 330 or in the drop cable groove 352 of the upper body half 350 similar to the embodiment described above with reference to FIG. 7. Once the drop cable 100 is properly tensioned, the stem 314 is tightened by rotating the stem clockwise, seen in FIG. 45, which is translated to movement of the lower body half 330 relative to the upper body half 350 to lock the drop cable 100 and main span cable 200 in place within the clamp 300, as shown in FIGS. 45 and 46.

Figure 45:
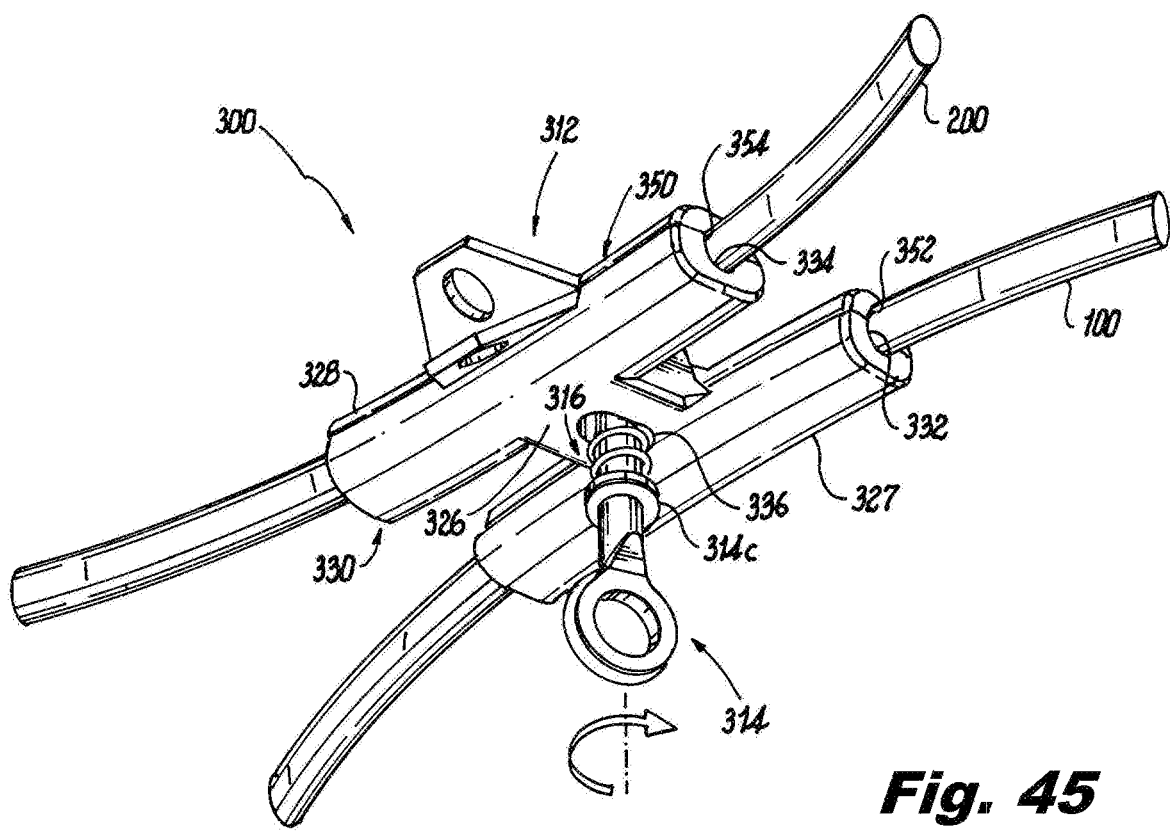
FIG. 45 is a bottom perspective view of the cable clamp of FIG. 44, illustrating the cable clamp body in a clamping position, a drop cable in a drop cable opening on a drop cable section of the cable clamp, and a main span cable in a main span cable opening in a main span cable section of the cable clamp.
Figure 46:
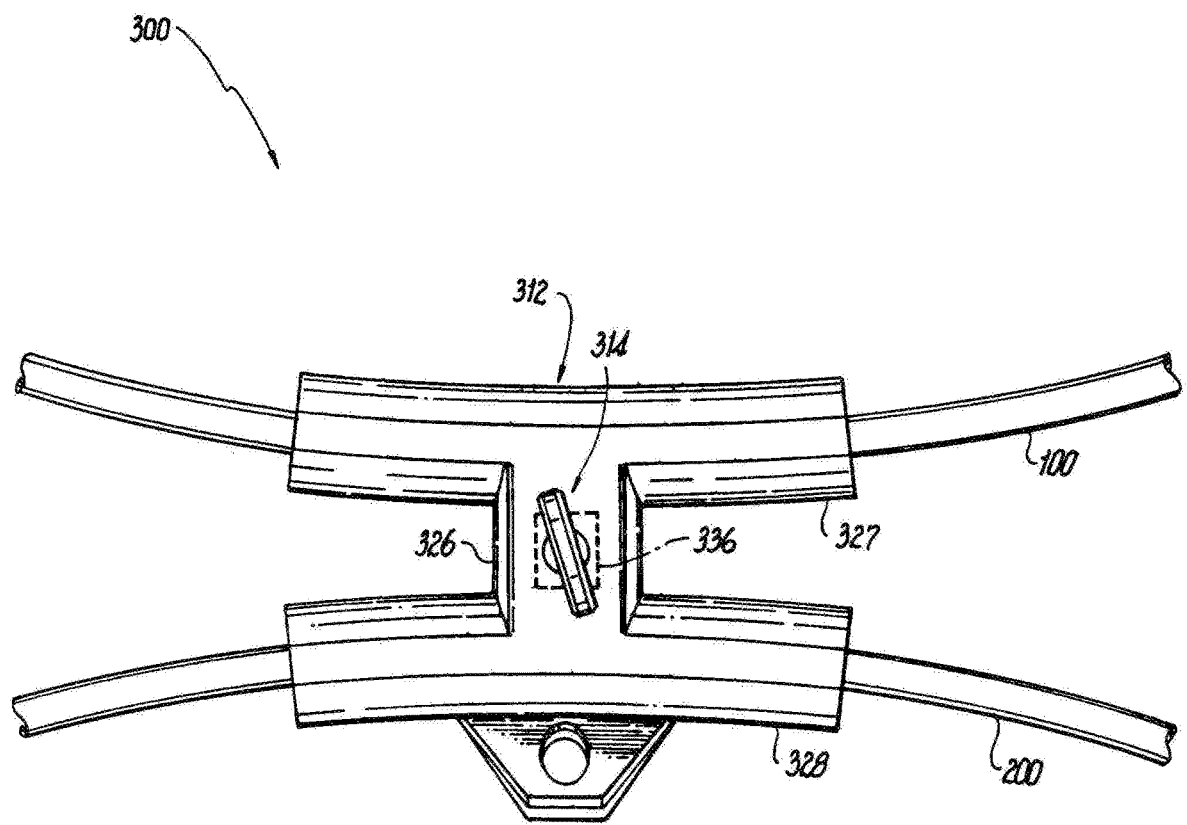
FIG. 46 is a bottom plan view of the cable clamp of FIG. 44, illustrating the cable clamp body in a clamping position, a drop cable in a drop cable opening on a drop cable section of the cable clamp, and a main span cable in a main span cable opening in a main span cable section of the cable clamp.

It is noted that the cable openings 360 and 362 are configured in this exemplary embodiment so that the drop cable 100 and the main span cable 200 sit within their respective cable openings in a vertical orientation as shown in FIG. 45. By orienting the cables in a vertical orientation bend stresses on the main span cable can be minimized. It is also noted that the cable openings 360 and 362 are configured so that when the two body halves 330 and 350 are in the clamping position the cable openings bottom out preventing the exertion of excessive force to the drop cable and/or main span cable, and thus preventing crushing and possibly damaging the cable no matter how much torque is applied to the stem 314. More specifically, and referring to FIG. 29, when the two body halves 330 and 350 come together the height H3 of cable opening 360 is defined by the flat surface 333 on the lower body half 330 and the flat surface 353 on the upper body half 350. Similarly, the height H4 of cable opening 362 is defined by the flat surfaces 335 and 337 on the lower body half 330 and the flat surface 355 and 357 on the upper body half 350. The height H3 and H4 can be set so that there is suitable clamping of a cable inserted in the cable respective openings 360 and 362, and possibly permitting a certain amount of jacket deflection in the cable without crushing the cable within the opening to a point causing, for example, an attenuation increase resulting in a signal loss and/or mechanical damage to the fiber within the cables. The height H3 and H4 can be the same or they can differ depending upon the size and type of drop cable and main span cable used. For example, the height H3 and H4 may be in the range from about 0.5 inches to about 0.8 inches.

Figure 47:
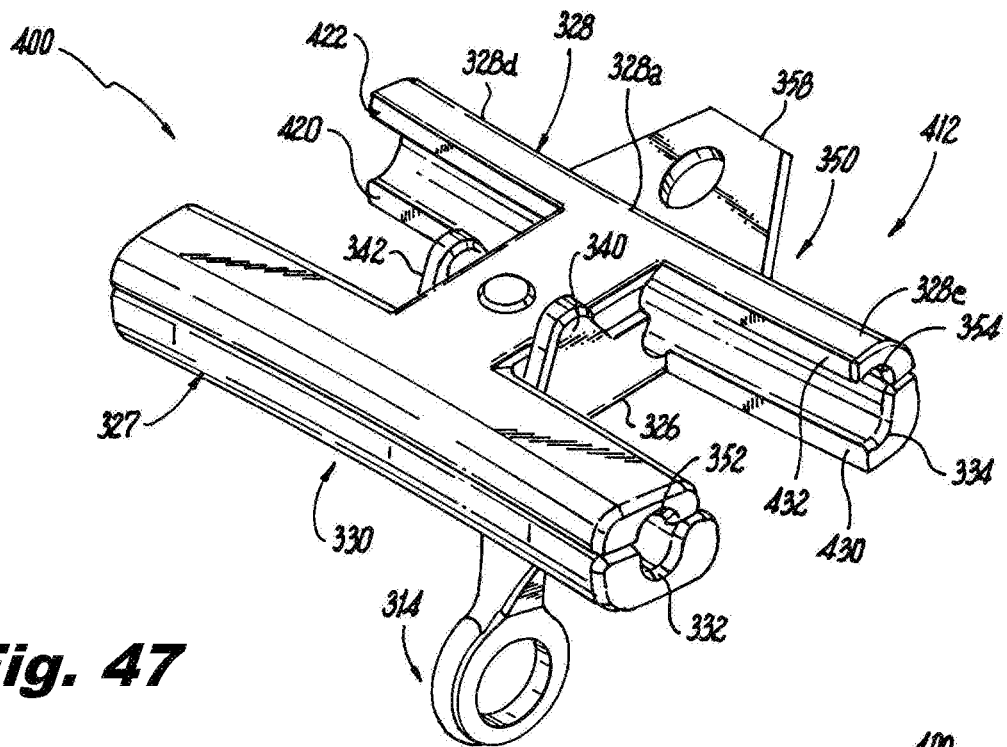
FIG. 47 is a top perspective view of another exemplary embodiment of a cable clamp according to the present disclosure illustrating the cable clamp in a clamping position and a main span cable section of the cable clamp having an open wall portion.
Figure 48:
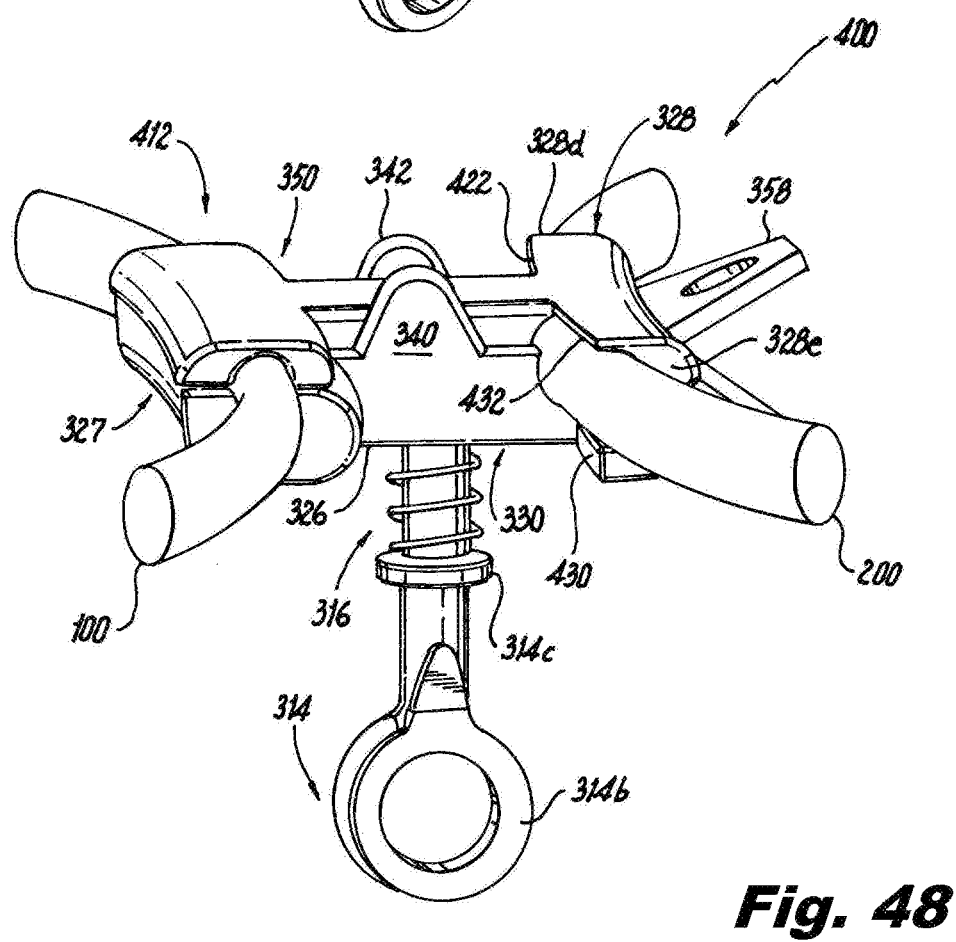
FIG. 48 is a top perspective view of the cable clamp of FIG. 47, illustrating the cable clamp body in a clamping position, a drop cable in a drop cable opening on a drop cable section of the cable clamp, and a main span cable in a main span cable opening in a main span cable section of the cable clamp.

Referring now to FIGS. 47 and 48, another exemplary embodiment of the clamp according to the present disclosure is shown. In this exemplary embodiment, the clamp 400 is similar to clamp 300 such that common elements will have the same reference numerals as the clamp 300. The clamp 400 includes a body 412, a stem 314 and a spring 316. A description of the common features of the body 412, stem 314 and spring 316 are provided above and for ease of description is not repeated.

The body 412 in this exemplary embodiment is substantially similar to the body 312 except that the main span cable guide 328 differs. In this exemplary embodiment, the main span cable guide 328 includes a central section 328a, a first extension section 328d extending from one side of the central section and a second extension section 328e extending from another side of the central section. The central section 328a of the body 412 is substantially the same as the central section described above. The first extension section 328d of the lower body half 330 has a partial wall 420 forming a portion of the main span cable groove 334. Similarly, second extension section 328e of the lower body half 330 has a partial wall 430 also forming a portion of the main span cable groove 334. The first extension section 328d of the upper body half 350 has a partial wall 422 forming a portion of the main span cable groove 354. Similarly, second extension section 328e of the upper body half 350 has a partial wall 432 also forming a portion of the main span cable groove 354. The partial walls allow additional flexibility of the main span cable 200 when the clamp 400 is attached to a drop cable 100 and a main span cable 200. In addition, the partial walls also reduce the cost to manufacture the clamp 400 by using less material.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A fiber optic cable clamp comprising:
a body comprising:
an elongated drop cable guide;
an elongated main span cable guide;
a main body section between the drop cable guide and the main span cable guide; and
wherein the body has a lower body half and an upper body half, wherein the lower body half is movable relative to the upper body half;
wherein when the body is in a clamping position the lower body half and upper body half of the drop cable guide form a drop cable opening and the lower body half and upper body half of the main span cable guide form a main span cable opening;
wherein the drop cable opening has a first fixed height set by at least one surface of the lower body half contacting at least one surface of the upper body; and
wherein the main span cable opening has a second fixed height set by at least one surface of the lower body half contacting at least one surface of the upper body half;
a stem extending through an opening in the lower body half of the main body section into a threaded opening in the upper body half of the main body section such that rotational movement of the stem relative to the upper body half of the main body section permits independent movement of the lower body half relative to the upper body half while the stem remains substantially perpendicular to the upper body half of the main body section, the stem having a collar; and
a spring positioned on the stem between the collar and the lower body half of the main body section to normally bias the lower body half toward the upper body half.

2. The cable clamp according to claim 1, wherein the lower body half of the main span cable guide has a lower lever arm extending therefrom and the upper body half of the main span cable guide has an upper lever arm extending therefrom.

3. The cable clamp according to claim 2, wherein when the lower lever arm and the upper lever arm are pinched together the lower body half pivots relative to the upper body half moving the body to a first open position providing access to the drop cable opening and compressing the spring.

4. The cable clamp according to claim 2, wherein when the lower lever arm and the upper lever arm are un-pinched the spring biases the lower body half toward the upper body half so that the body is in the clamping position.

5. The cable clamp according to claim 2, wherein when the lower lever arm and the upper lever arm are spread apart the lower body half pivots relative to the upper body half moving the body to a second open position providing access to the main span cable opening and compressing the spring.

6. The cable clamp according to claim 5, wherein when the lower lever arm and the upper lever arm are returned to an un-spread position the spring biases the lower body half toward the upper body half so that the body is in the clamping position.

7. The cable clamp according to claim 1, wherein the drop cable opening has a predefined height that limits the compression force that can be applied to a drop cable within the drop cable opening.

8. The cable clamp according to claim 1, wherein the main span cable opening has a predefined height that limits the compression force that can be applied to a main span cable within the main span cable opening.

9. A fiber optic cable clamp comprising:
a body having a lower body half and an upper body half, wherein the lower body half is movable relative to the upper body half, and wherein when the body is in a clamping position the lower body half and upper body half form a drop cable opening and a main span cable opening, the drop cable opening having a first fixed height set by at least one surface of the lower body half contacting at least one surface of the upper body, and the main span cable opening having a second fixed height set by at least one surface of the lower body half contacting at least one surface of the upper body half;
a stem extending through an opening in the lower body half into a threaded opening in the upper body half such that rotational movement of the stem relative to the upper body half of the main body section permits independent movement of the lower body half relative to the upper body half while the stem remains substantially perpendicular to the upper body half of the main body section, the stem having a collar; and
a spring positioned on the stem between the collar and the lower body half to normally bias the lower body half toward the upper body half.

10. The cable clamp according to claim 9, wherein the lower body half has a lower lever arm extending therefrom and the upper body half has an upper lever arm extending therefrom.

11. The cable clamp according to claim 10, wherein when the lower lever arm and the upper lever arm are pinched together the lower body half pivots relative to the upper body half moving the body to a first open position providing access to the drop cable opening and compressing the spring.

12. The cable clamp according to claim 11, wherein when the lower lever arm and the upper lever arm are un-pinched the spring biases the lower body half toward the upper body half so that the body is in the clamping position.

13. The cable clamp according to claim 10, wherein when the lower lever arm and the upper lever arm are spread apart the lower body half pivots relative to the upper body half moving the body to a second open position providing access to the main span cable opening and compressing the spring.

14. The cable clamp according to claim 13, wherein when the lower lever arm and the upper lever arm are returned to an un-spread position the spring biases the lower body half toward the upper body half so that the body is in the clamping position.

15. The cable clamp according to claim 9, wherein the drop cable opening has a predefined height that limits the compression force that can be applied to a drop cable within the drop cable opening.

16. The cable clamp according to claim 9, wherein the main span cable opening has a predefined height that limits the compression force that can be applied to a main span cable within the main span cable opening.

17. A fiber optic cable clamp comprising:
a body comprising an elongated drop cable guide and an elongated main span cable guide, wherein the body has a lower body half and an upper body half, wherein the lower body half is movable relative to the upper body half, and wherein when the body is in a clamping position the lower body half and upper body half of the drop cable guide form a drop cable opening and the lower body half and upper body half of the main span cable guide form a main span cable opening, the drop cable opening having a first fixed height set by at least one surface of the lower body half contacting at least one surface of the upper body, and the main span cable opening having a second fixed height set by at least one surface of the lower body half contacting at least one surface of the upper body half;
a stem extending through an opening in the lower body half into a threaded opening in the upper body half such that rotational movement of the stem relative to the upper body half of the main body section permits independent movement of the lower body half relative to the upper body half while the stem remains substantially perpendicular to the upper body half of the main body section, the stem having a collar; and
a spring positioned on the stem between the collar and the lower body half to normally bias the lower body half toward the upper body half.

18. The cable clamp according to claim 17, wherein the lower body half of the main span cable guide has a lower lever arm extending therefrom and the upper body half of the main span cable guide has an upper lever arm extending therefrom.

19. The cable clamp according to claim 18, wherein when the lower lever arm and the upper lever arm are pinched together the lower body half pivots relative to the upper body half moving the body to a first open position providing access to the drop cable opening and compressing the spring.

20. The cable clamp according to claim 18, wherein when the lower lever arm and the upper lever arm are un-pinched the spring biases the lower body half toward the upper body half so that the body is in the clamping position.

21. The cable clamp according to claim 18, wherein when the lower lever arm and the upper lever arm are spread apart the lower body half pivots relative to the upper body half moving the body to a second open position providing access to the main span cable opening and compressing the spring.

22. The cable clamp according to claim 21, wherein when the lower lever arm and the upper lever arm are returned to an un-spread position the spring biases the lower body half toward the upper body half so that the body is in the clamping position.

23. The cable clamp according to claim 17, wherein the drop cable opening has a predefined height that limits the compression force that can be applied to a drop cable within the drop cable opening.

24. The cable clamp according to claim 17, wherein the main span cable opening has a predefined height that limits the compression force that can be applied to a main span cable within the main span cable opening.

25. The cable clamp according to claim 1, wherein the first fixed height is the same as the second fixed height.

26. The cable clamp according to claim 1, wherein the first fixed height is set by the lower body half and the upper body half so that there is suitable clamping of a first cable inserted in the drop cable opening without damaging the first cable within the drop cable opening.

27. The cable clamp according to claim 1, wherein the second fixed height is set by the lower body half and the upper body half so that there is suitable clamping of a second cable inserted in the main span cable opening without damaging the second cable within the main span cable opening.

28. The cable clamp according to claim 9, wherein the first fixed height is the same as the second fixed height.

29. The cable clamp according to claim 9, wherein the first fixed height is set by the lower body half and the upper body half so that there is suitable clamping of a first cable inserted in the drop cable opening and possibly permitting a certain amount of deflection of a jacket of the first cable without damaging the first cable within the drop cable opening.

30. The cable clamp according to claim 9, wherein the second fixed height is set by the lower body half and the upper body half so that there is suitable clamping of a second cable inserted in the main span cable opening and possibly permitting a certain amount of deflection of a jacket of the second cable without damaging the second cable within the main span cable opening.

31. The cable clamp according to claim 17, wherein the first fixed height is the same as the second fixed height.

32. The cable clamp according to claim 17, wherein the first fixed height is set by the lower body half and the upper body half so that there is suitable clamping of a first cable inserted in the drop cable opening and possibly permitting a certain amount of deflection of a jacket of the first cable without damaging the first cable within the drop cable opening.

33. The cable clamp according to claim 17, wherein the second fixed height is set by the lower body half and the upper body half so that there is suitable clamping of a second cable inserted in the main span cable opening and possibly permitting a certain amount of deflection of a jacket of the second cable without damaging the second cable within the main span cable opening.

* * * * *